(12) United States Patent
Ohyabu

(10) Patent No.: US 11,814,135 B2
(45) Date of Patent: Nov. 14, 2023

(54) CRANK ASSEMBLY FOR HUMAN POWERED VEHICLE

(71) Applicant: SHIMANO INC., Sakai (JP)

(72) Inventor: Kohei Ohyabu, Sakai (JP)

(73) Assignee: SHIMANO INC., Sakai (JP)

(*) Notice: Subject to any disclaimer, the term of this patent is extended or adjusted under 35 U.S.C. 154(b) by 0 days.

(21) Appl. No.: 17/721,328

(22) Filed: Apr. 14, 2022

(65) Prior Publication Data

US 2023/0331340 A1    Oct. 19, 2023

(51) Int. Cl.
| | | |
|---|---|---|
| *B62M 1/36* | (2013.01) | |
| *B62M 9/10* | (2006.01) | |
| *B62M 9/00* | (2006.01) | |

(52) U.S. Cl.
CPC ............. *B62M 1/36* (2013.01); *B62M 9/105* (2013.01); *B62M 2009/007* (2013.01)

(58) Field of Classification Search
CPC ..... B62J 13/00; Y10T 74/2164; B62M 9/105; B62M 2009/007; B62M 3/00; B62M 9/10; B62M 9/138; B62M 1/36; F16H 55/30
USPC .................................. 474/140, 144
See application file for complete search history.

(56) References Cited

U.S. PATENT DOCUMENTS

| | | | | |
|---|---|---|---|---|
| 877,820 A | * | 1/1908 | Badger ...................... | F16H 7/18 74/609 |
| 3,477,303 A | * | 11/1969 | Brilando .................. | B62M 9/10 474/144 |
| 3,815,439 A | * | 6/1974 | Tarutani .................... | B62M 9/10 474/144 |
| 3,835,729 A | * | 9/1974 | Tarutani .................... | F16P 1/04 474/144 |
| 4,044,621 A | * | 8/1977 | McGregor, Sr. ........ | F16H 55/30 74/609 |
| 4,240,303 A | * | 12/1980 | Mosley .................... | F16H 57/04 474/151 |
| 4,487,424 A | * | 12/1984 | Ellis ......................... | B62J 13/00 74/609 |
| 5,003,840 A | * | 4/1991 | Hinschlager ............. | B62J 23/00 74/609 |
| 5,273,495 A | * | 12/1993 | Nagano .................... | B62M 9/00 74/609 |
| 5,320,583 A | * | 6/1994 | van Wingen born Looyen .......... | B62J 13/00 74/609 |

(Continued)

FOREIGN PATENT DOCUMENTS

| | | |
|---|---|---|
| JP | 56-139692 | 10/1981 |
| JP | 56-170089 | 12/1981 |
| TW | M513838 | 12/2015 |

*Primary Examiner* — Henry Y Liu
(74) *Attorney, Agent, or Firm* — MORI & WARD, LLP

(57) ABSTRACT

A crank assembly comprises a crank arm, a front sprocket unit, and at least one chain-drop control protrusion. The at least one chain-drop control protrusion is configured to inhibit a drive chain from getting into a space provided radially inwardly from the at least one control protrusion and between the crank arm and the front sprocket unit in the axial direction. The at least one chain-drop control protrusion is configured to be provided to at least one of an axially inwardly facing crank-surface of the crank arm and an axially outwardly facing sprocket-surface of the front sprocket unit. The at least one chain-drop control protrusion has a through bore.

22 Claims, 33 Drawing Sheets

(56) References Cited

U.S. PATENT DOCUMENTS

| | | | | |
|---|---|---|---|---|
| 5,725,450 A * | 3/1998 | Huskey | ................... | B62M 9/16 474/134 |
| 6,354,973 B1 * | 3/2002 | Barnett | ................... | B62J 13/00 474/140 |
| 6,443,865 B1 * | 9/2002 | Yamanaka | ............ | B62M 9/105 474/144 |
| 6,450,909 B1 * | 9/2002 | Yamanaka | ............... | B62M 3/00 474/144 |
| 6,533,690 B2 * | 3/2003 | Barnett | ................. | B62M 9/138 474/140 |
| 7,523,685 B2 * | 4/2009 | French | ................... | B62M 3/00 74/594.1 |
| 7,562,604 B2 * | 7/2009 | Fukui | ..................... | B62J 13/04 74/594.1 |
| 7,686,721 B2 * | 3/2010 | Tabe | ..................... | B62M 9/105 474/116 |
| 7,753,815 B2 * | 7/2010 | Saifuddin | ............. | B62M 9/105 474/151 |
| 8,235,849 B2 * | 8/2012 | Cranston | ................. | B62J 13/00 280/727 |
| 9,249,867 B2 * | 2/2016 | Graziosi | ................... | F16H 7/18 |
| 9,771,128 B2 * | 9/2017 | Sugimoto | ............... | B62M 3/00 |
| 10,221,887 B2 * | 3/2019 | Dubois | ................... | F16C 25/06 |
| 10,780,947 B2 * | 9/2020 | Kao | ........................ | B62M 3/16 |
| 2002/0160869 A1 * | 10/2002 | Barnett | ................. | B62M 9/138 474/144 |
| 2005/0284252 A1 * | 12/2005 | Fukui | ..................... | B62M 3/003 74/594.2 |
| 2006/0058139 A1 * | 3/2006 | Fry | ......................... | B62J 13/00 474/144 |
| 2006/0199690 A1 * | 9/2006 | Gardner | ................... | F16H 7/18 474/144 |
| 2008/0176691 A1 * | 7/2008 | Saifuddin | ............. | B62M 9/105 474/144 |
| 2008/0293528 A1 * | 11/2008 | Paull | ....................... | B62J 13/00 474/144 |
| 2009/0062049 A1 * | 3/2009 | Cranston | ................. | B62J 13/00 474/144 |
| 2014/0182393 A1 * | 7/2014 | Heinkel | ................. | G01L 3/242 73/862.28 |

* cited by examiner

CRANK ASSEMBLY FOR HUMAN POWERED VEHICLE

BACKGROUND

Technical Field

The present invention relates to a crank assembly for a human powered vehicle.

Background Information

A human powered vehicle includes a crank unit. The crank unit includes an arm and a sprocket. A pedal is attached to the arm. The sprocket is rotatable along with the arm. A chain is engaged with sprocket teeth of the sprocket. The chain may drop off from the sprocket teeth toward the arm. It is preferable to restrict the chain from getting into a space provided between the sprocket and the arm when the chain drops off from the sprocket teeth.

SUMMARY

In accordance with a first aspect of the present invention, a crank assembly for a human-powered vehicle comprises a crank arm, a front sprocket unit, and at least one chain-drop control protrusion. The crank arm has an axially outwardly facing crank-surface and an axially inwardly facing crank-surface provided on a reverse side of the axially outwardly facing crank-surface in an axial direction with respect to a rotational center axis of the crank assembly. The axially inwardly facing crank-surface is configured to face toward an axial center plane of the human powered vehicle in the axial direction in a mounted state where the crank assembly is mounted to the human powered vehicle. The front sprocket unit has an axially outwardly facing sprocket-surface and an axially inwardly facing sprocket-surface provided on a reverse side of the axially outwardly facing sprocket-surface in the axial direction. The axially inwardly facing sprocket-surface is configured to face toward the axial center plane of the human powered vehicle in the axial direction in the mounted state. The front sprocket unit includes a sprocket body and a plurality of sprocket teeth extending radially outwardly from the sprocket body in a radial direction with respect to the rotational center axis. The at least one chain-drop control protrusion is configured to inhibit a drive chain from getting into a space provided radially inwardly from the at least one control protrusion and between the crank arm and the front sprocket unit in the axial direction. The at least one chain-drop control protrusion is configured to be provided to at least one of the axially inwardly facing crank-surface of the crank atm and the axially outwardly facing sprocket-surface of the front sprocket unit. The at least one chain-drop control protrusion has a through bore.

With the crank assembly according to the first aspect, the through bore saves weight of the at least one chain-drop control protrusion. Thus, the at least one chain-drop control protrusion can restrict the drive chain from getting into the space provided between the front sprocket unit and the crank arm when the drive chain drops off from the plurality of sprocket teeth of the front sprocket unit while saving weight of the crank assembly.

In accordance with a second aspect of the present invention, the crank assembly according to the first aspect is configured so that the at least one chain-drop control protrusion has a free end and an attachment end configured to be coupled to the at least one of the axially inwardly facing crank-surface of the crank arm and the axially outwardly facing sprocket-surface of the front sprocket unit. The through bore has a bore center-axis extending from one of the free end and the attachment end to the other of the free end and the attachment end.

With the crank assembly according to the second aspect, the at least one chain-drop control protrusion can restrict the drive chain from getting into the space provided between the front sprocket unit and the crank arm when the drive chain drops off from the plurality of sprocket teeth of the front sprocket unit while reliably saving weight of the crank assembly.

In accordance with a third aspect of the present invention, the crank assembly according to the second aspect is configured so that the at least one chain-drop control protrusion has a chain-drop control section and an attachment section adjacent to the chain-drop control section in a bore axial direction with respect to the bore center-axis. The chain-drop control section includes the free end. The attachment section includes the attachment end.

With the crank assembly according to the third aspect, the chain-drop control section can reliably restrict the drive chain from getting into the space provided between the front sprocket unit and the crank arm when the drive chain drops off from the plurality of sprocket teeth of the front sprocket unit while saving weight of the crank assembly.

In accordance with a fourth aspect of the present invention, the crank assembly according to the third aspect is configured so that the chain-drop control section has a first maximum diameter with respect to the bore center-axis. The attachment section has a second maximum diameter with respect to the bore center-axis. The first maximum diameter is larger than the second maximum diameter.

With the crank assembly according to the fourth aspect, the second maximum diameter can reduce a size of an attachment hole of the front sprocket unit to which the attachment section is attached. Thus, it is possible to ensure rigidity of at least one of the front sprocket unit and the crank arm.

In accordance with a fifth aspect of the present invention, the crank assembly according to the third or fourth aspect is configured so that the chain-drop control section has a first axial length with respect to the bore center-axis. The attachment section has a second axial length with respect to the bore center-axis. The first axial length is larger than the second axial length.

With the crank assembly according to the fifth aspect, it is possible to reliably save weight of the at least one chain-drop control protrusion.

In accordance with a sixth aspect of the present invention, the crank assembly according to any one of the third to fifth aspects is configured so that the chain-drop control section has a radially outermost surface with respect to the bore center-axis and a chamfered portion. The free end has an axial free-end surface with respect to the bore center-axis. The chamfered portion is provided between the radially outermost surface and the axial free-end surface.

With the crank assembly according to the sixth aspect, the chamfered portion enables the chain-drop control section to be arranged closer to one of the front sprocket unit and the crank arm while the at least one chain-drop control protrusion restricts the drive chain from getting into the space provided between the front sprocket unit and the crank arm when the drive chain drops off from the plurality of sprocket teeth of the front sprocket unit while reliably saving weight of the crank assembly.

In accordance with a seventh aspect of the present invention, the crank assembly according to the sixth aspect is configured so that the chamfered portion has a curvature.

With the crank assembly according to the seventh aspect, the chamfered portion reliably enables the chain-drop control section to be arranged closer to one of the front sprocket unit and the crank arm while the at least one chain-drop control protrusion restricts the drive chain from getting into the space provided between the front sprocket unit and the crank arm when the drive chain drops off from the plurality of sprocket teeth of the front sprocket unit while reliably saving weight of the crank assembly.

In accordance with an eighth aspect of the present invention, the crank assembly according to any one of the third to seventh aspects is configured so that the through bore has a non-threaded portion provided at least in the chain-drop control section of the at least one chain-drop control protrusion.

With the crank assembly according to the eighth aspect, the threaded portion enables another member to be attached to the at least one chain-drop control protrusion.

In accordance with a ninth aspect of the present invention, the crank assembly according to the eighth aspect further comprises an additional chain-drop control protrusion configured to threadedly engage with the threaded portion of the through bore.

With the crank assembly according to the ninth aspect, it is possible to adapt the at least one chain-drop control protrusion to a variety of crank assemblies by attaching or detaching the additional chain-drop control protrusion to or from the at least one chain-drop control protrusion.

In accordance with a tenth aspect of the present invention, the crank assembly according to any one of the third to ninth aspects is configured so that the through bore has a large diameter bore and a small diameter bore connected to the large diameter bore. The large diameter bore extends from the free end in a bore axial direction with respect to the bore center-axis. The small diameter bore extends from the attachment end in the bore axial direction.

With the crank assembly according to the tenth aspect, it is possible to attach another member to the at least one chain-drop control protrusion using at least one of the large diameter bore and the small diameter bore with accuracy.

In accordance with an eleventh aspect of the present invention, the crank assembly according to the tenth aspect is configured so that the large diameter bore and the small diameter bore are connected to each other at a connecting point. The threaded portion extends from the connecting point along the bore axial direction in the small diameter bore.

With the crank assembly according to the eleventh aspect, it is possible to attach another member to the at least one chain-drop control protrusion using at least one of the large diameter bore and the small diameter bore with higher accuracy.

In accordance with a twelfth aspect of the present invention, the crank assembly according to the eleventh aspect is configured so that the connecting point is located in the chain-drop control section.

With the crank assembly according to the twelfth aspect, the location of the connecting point makes the small diameter bore longer. Thus, it is possible to reliably attach another member to the at least one chain-drop control protrusion using the small diameter bore with higher accuracy.

In accordance with a thirteenth aspect of the present invention, the crank assembly according to any one of the third to twelfth aspects is configured so that the attachment section has a non-circular cross-sectional shape.

With the crank assembly according to the thirteenth aspect, the non-circular cross-sectional shape can restrict the at least one chain-drop control protrusion from rotating relative to at least one of the crank arm and the front sprocket unit when another member is attached to the at least one chain-drop control protrusion.

In accordance with a fourteenth aspect of the present invention, the crank assembly according to any one of the eighth to thirteenth aspects is configured so that the at least one chain-drop control protrusion has a chain-drop control section and an attachment section adjacent to the chain-drop control section in a bore axial direction with respect to the bore center-axis. The through bore has a non-threaded portion provided in the attachment section and adjacent to the threaded portion. The non-threaded portion has a non-threaded internal diameter that is equal to an internal minor diameter of the threaded portion.

With the crank assembly according to the fourteenth aspect, the non-threaded portion makes it possible to easily form the threaded portion in the through bore.

In accordance with a fifteenth aspect of the present invention, the crank assembly according to any one of the first to fourteenth aspects further comprises an electrical component provided to the crank arm at a location radially inwardly from the at least one chain-drop control protrusion.

With the crank assembly according to the fifteenth aspect, the at least one chain-drop control protrusion can reduce interference between the drive chain and the electrical component when the drive chain drops off from the plurality of sprocket teeth of the front sprocket unit. Thus, it is possible to protect the electrical component from the drive chain when the drive chain drops off from the plurality of sprocket teeth of the front sprocket unit.

In accordance with a sixteenth aspect of the present invention, the crank assembly according to the fifteenth aspect is configured so that the electrical component includes a force sensor.

With the crank assembly according to the sixteenth aspect, the at least one chain-drop control protrusion can protect the force sensor from the drive chain when the drive chain drops off from the plurality of sprocket teeth of the front sprocket unit.

In accordance with a seventeenth aspect of the present invention, the crank assembly according to the fifteenth or sixteenth aspect further comprises a cover member configured to be attached to the axially inwardly facing crank-surface of the crank arm so as to cover the electrical component in an assembled state of the crank assembly.

With the crank assembly according to the seventeenth aspect, the at least one chain-drop control protrusion can protect the cover member from the drive chain when the drive chain drops off from the plurality of sprocket teeth of the front sprocket unit. Furthermore, the cover member can reliably protect the electrical component from the drive chain when the drive chain drops off from the plurality of sprocket teeth of the front sprocket unit.

In accordance with an eighteenth aspect of the present invention, the crank assembly according to the seventeenth aspect is configured so that the cover member is made of a non-metallic material.

With the crank assembly according to the eighteenth aspect, the at least one chain-drop control protrusion can protect the cover member made of the non-metallic material from the drive chain when the drive chain drops off from the plurality of sprocket teeth of the front sprocket unit. Furthermore, the cover member can reliably protect the electrical component from the drive chain when the drive chain drops off from the plurality of sprocket teeth of the front sprocket unit while saving weight of the crank assembly.

In accordance with a nineteenth aspect of the present invention, the crank assembly according to any one of the first to eighteenth aspects is configured so that the at least one chain-drop control protrusion includes a plurality of chain-drop control protrusions spaced apart from each other in a circumferential direction with respect to the rotational center axis.

With the crank assembly according to the nineteenth aspect, the plurality of chain-drop control protrusions can reliably restrict the drive chain from getting into the space provided between the front sprocket unit and the crank arm when the drive chain drops off from the plurality of sprocket teeth of the front sprocket unit.

In accordance with a twentieth aspect of the present invention, the crank assembly according to any one of the first to nineteenth aspects is configured so that the at least one chain-drop control protrusion is disposed radially inwardly from the plurality of sprocket teeth.

With the crank assembly according to the twentieth aspect, the at least one chain-drop control protrusion can reliably restrict the drive chain from getting into the space provided between the front sprocket unit and the crank arm when the drive chain drops off from the plurality of sprocket teeth of the front sprocket unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
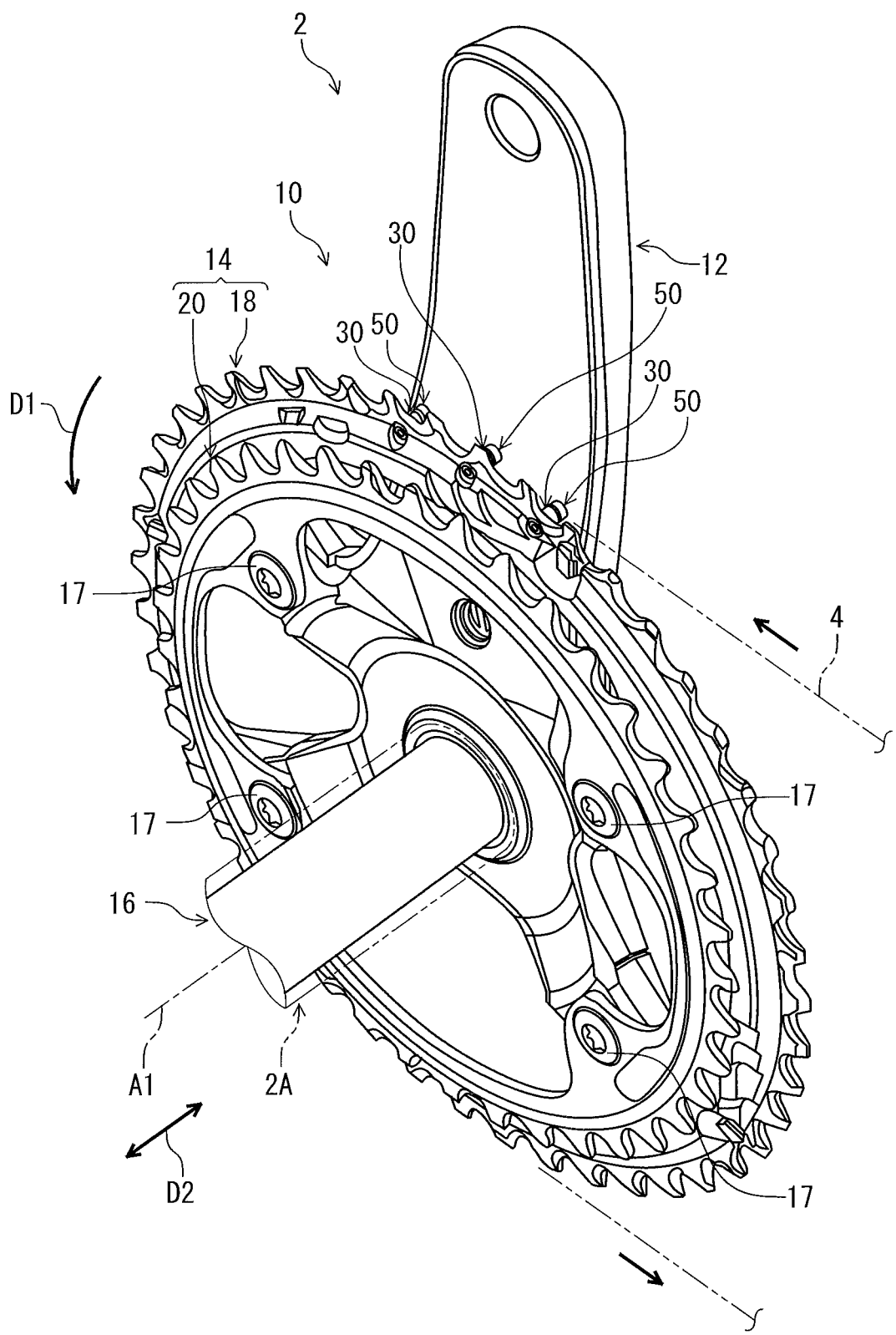
FIG. 1 is a perspective view of a crank assembly in accordance with a first embodiment.

The embodiment(s) will now be described with reference to the accompanying drawings, wherein like reference numerals designate corresponding or identical elements throughout the various drawings.

First Embodiment

As seen in FIG. 1, a crank assembly 10 for a human powered vehicle 2 is rotatable relative to a vehicle body 2A about a rotational center axis A1. The crank assembly 10 is configured to be rotated relative to the vehicle body 2A about the rotational center axis A1 in a rotational driving direction D1 during pedaling.

In the present application, a human powered vehicle is a vehicle to travel with a motive power including at least a human power of a user who rides the human powered vehicle (i.e., rider). The human powered vehicle includes a various kind of bicycles such as a mountain bike, a road bike, a city bike, a cargo bike, a hand bike, and a recumbent bike. Furthermore, the human powered vehicle includes an electric bike (E-bike). The electric bike includes an electrically assisted bicycle configured to assist propulsion of a vehicle with an electric motor. However, a total number of wheels of the human powered vehicle is not limited to two. For example, the human powered vehicle includes a vehicle having one wheel or three or more wheels. Especially, the human powered vehicle does not include a vehicle that uses only an internal-combustion engine as motive power. Generally, a light road vehicle, which includes a vehicle that does not require a driver's license for a public road, is assumed as the human powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human powered vehicle 2 with facing a handlebar or a steering. Accordingly, these terms, as utilized to describe the crank assembly 10 or other components, should be interpreted relative to the human powered vehicle 2 equipped with the crank assembly 10 or other components as used in an upright riding position on a horizontal surface.

As seen in FIG. 1, the crank assembly 10 for the human powered vehicle 2 comprises a crank arm 12 and a front sprocket unit 14. The crank assembly 10 comprises a crank axle 16. The crank axle 16 extends along the rotational center axis A1. The crank axle 16 is configured to be rotatably supported by the vehicle body 2A about the rotational center axis A1. The crank arm 12 is secured to the crank axle 16 to rotate along with the crank axle 16 relative to the vehicle body 2A about the rotational center axis A1. The crank assembly 10 includes an additional crank arm secured to the crank axle 16. In the present embodiment, the crank arm 12 is a right crank arm. The additional crank atm is a left crank arm. However, the structure of the crank arm 12 can be applied to a left crank arm if needed and/or desired.

The front sprocket unit 14 is configured to be engaged with a drive chain 4. The front sprocket unit 14 is secured to at least one of the crank arm 12 and the crank axle 16. In the first embodiment, the front sprocket unit 14 is directly secured to the crank arm 12 with a plurality of fasteners 17. However, the front sprocket unit 14 can be directly secured to the crank axle 16 or both the crank arm 12 and the crank axle 16 if needed and/or desired.

Figure 2:
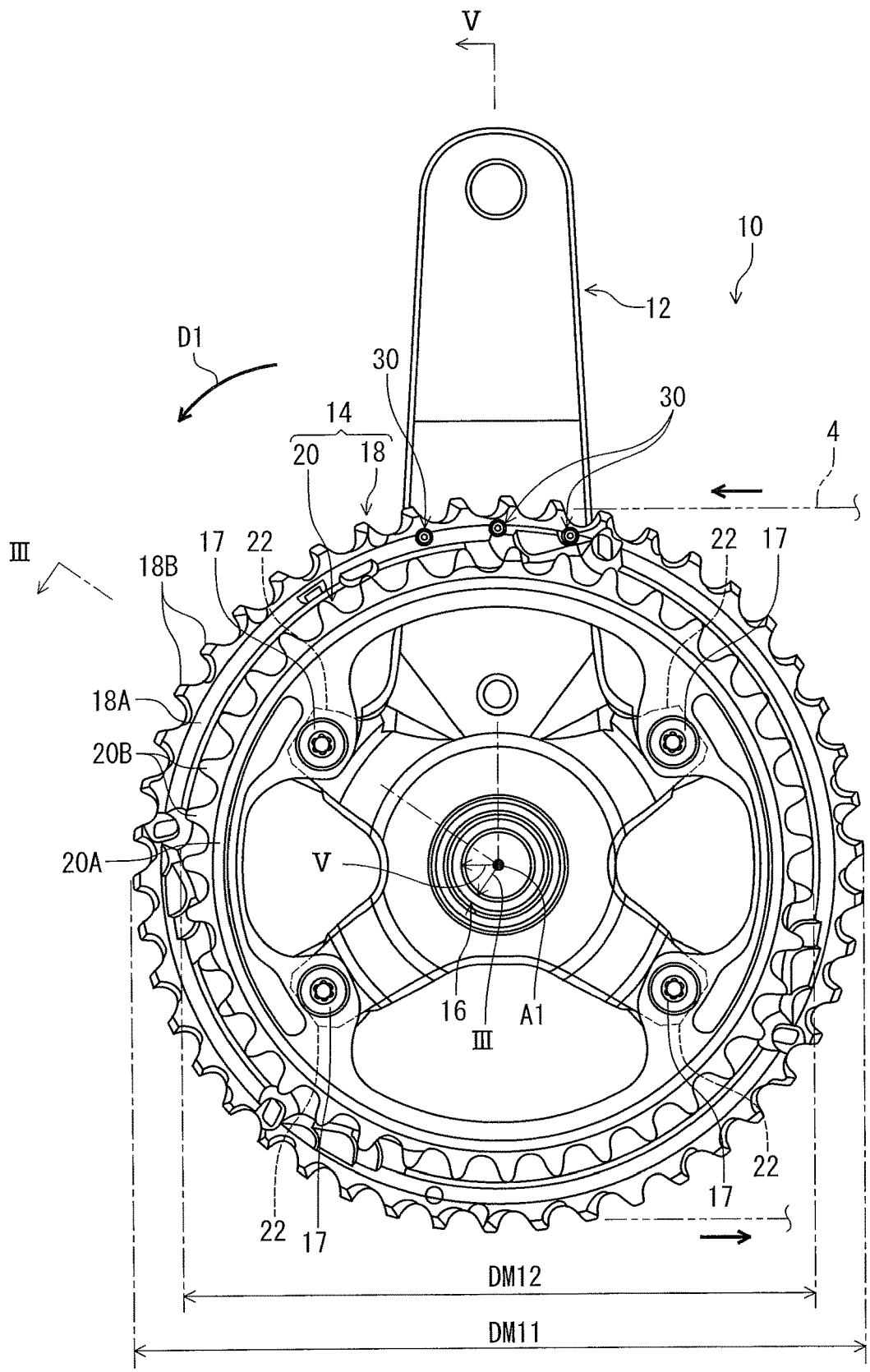
FIG. 2 is a side-elevational view of the crank assembly illustrated in FIG. 1, with one of crank arms omitted.

As seen in FIG. 2, the front sprocket unit 14 includes a first front sprocket 18 and a second front sprocket 20. The first front sprocket 18 and the second front sprocket 20 are secured to the crank arm 12 with the plurality of fasteners 17.

The first front sprocket 18 includes a sprocket body 18A and a plurality of sprocket teeth 18B. Namely, the front sprocket unit 14 includes the sprocket body 18A and the plurality of sprocket teeth 18B. The sprocket body 18A of the first front sprocket 18 is secured to the crank arm 12 with the plurality of fasteners 17. The plurality of sprocket teeth 18B extends radially outwardly from the sprocket body 18A in the radial direction with respect to the rotational center axis A1.

The first front sprocket 18 can also be referred to as a front sprocket 18. The sprocket body 18A can also be referred to as a first sprocket body 18A. The sprocket tooth can also be referred to as a first sprocket tooth.

The second front sprocket 20 includes a second sprocket body 20A and a plurality of second sprocket teeth 20B. The second sprocket body 20A of the second front sprocket 20 is secured to the crank arm 12 with the plurality of fasteners 17. The plurality of second sprocket teeth 20B extends radially outwardly from the second sprocket body 20A in the radial direction with respect to the rotational center axis A1.

The first front sprocket 18 has a first sprocket outer diameter DM11. The second front sprocket 20 has a second sprocket outer diameter DM12. The first sprocket outer diameter DM11 is larger than the second sprocket outer diameter DM12. However, the first sprocket outer diameter DM11 can be smaller than the second sprocket outer diameter DM12 if needed and/or desired. The second front sprocket 20 can be omitted from the front sprocket unit 14 if needed and/or desired.

Figure 3:
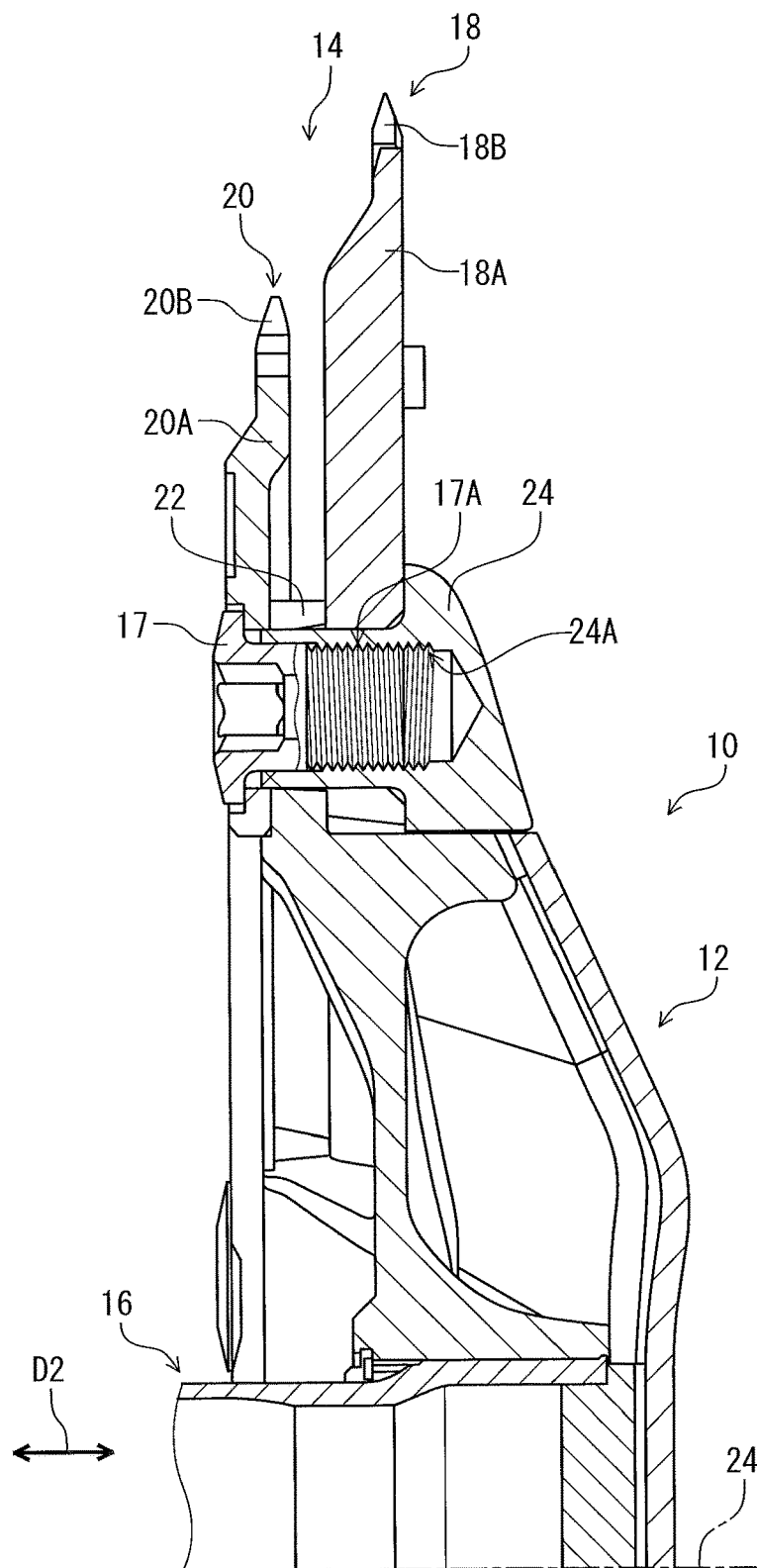
FIG. 3 is a cross-sectional view of the crank assembly taken along line of FIG. 2.

As seen in FIG. 2, the crank arm 12 includes a plurality of coupling parts 22. As seen in FIG. 3, the plurality of coupling parts 22 is provided between the first front sprocket 18 and the second front sprocket 20 in an axial direction D2 with respect to the rotational center axis A1 of the crank assembly 10.

Figure 4:
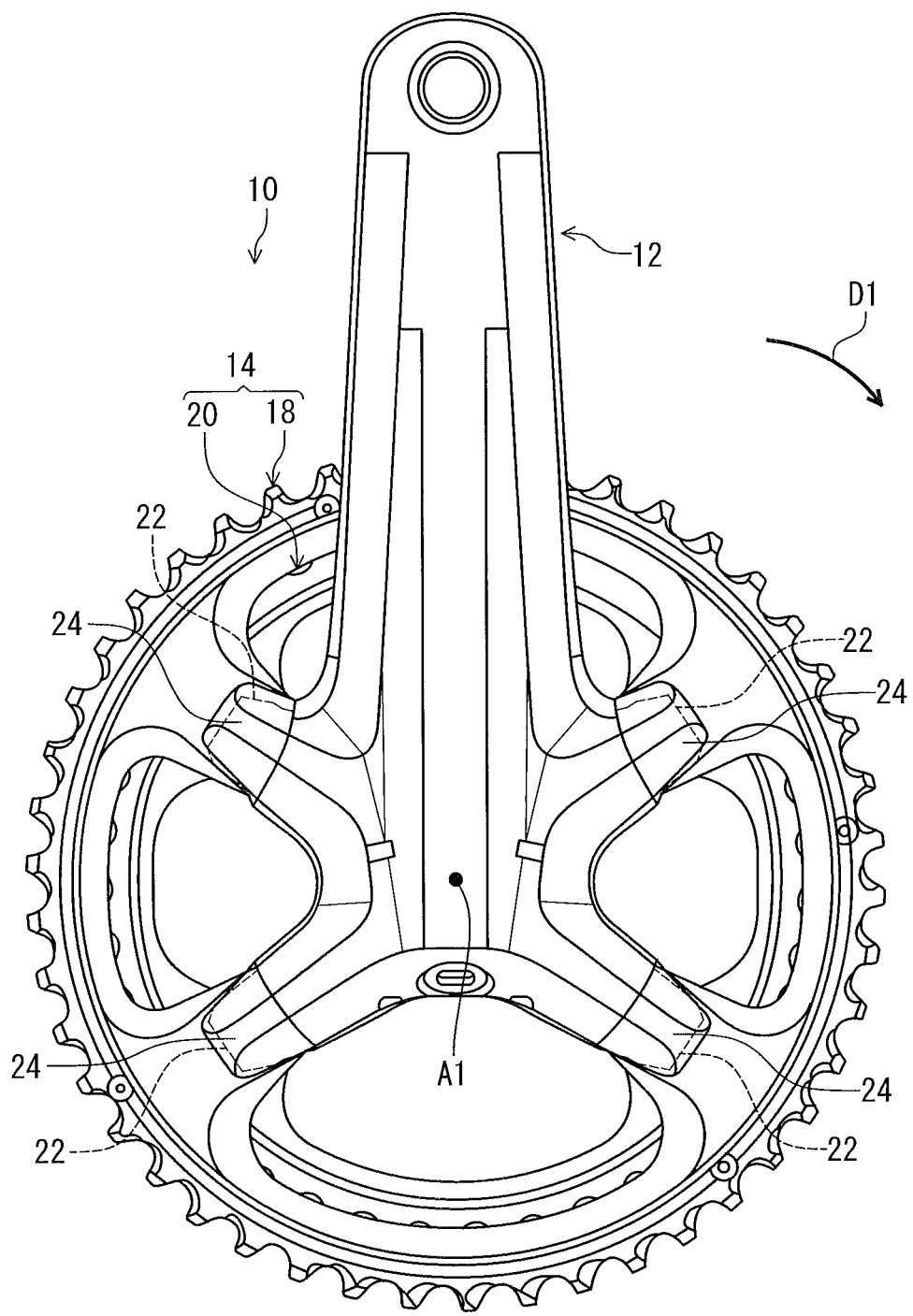
FIG. 4 is another side-elevational view of the crank assembly illustrated in FIG. 1.

As seen in FIG. 4, the front sprocket unit 14 includes a plurality of receiving members 24. As seen in FIG. 3, the receiving member 24 includes a threaded hole 24A. The fastener 17 includes an external thread 17A. The external thread 17A is engaged with the threaded hole 24A.

Figure 5:
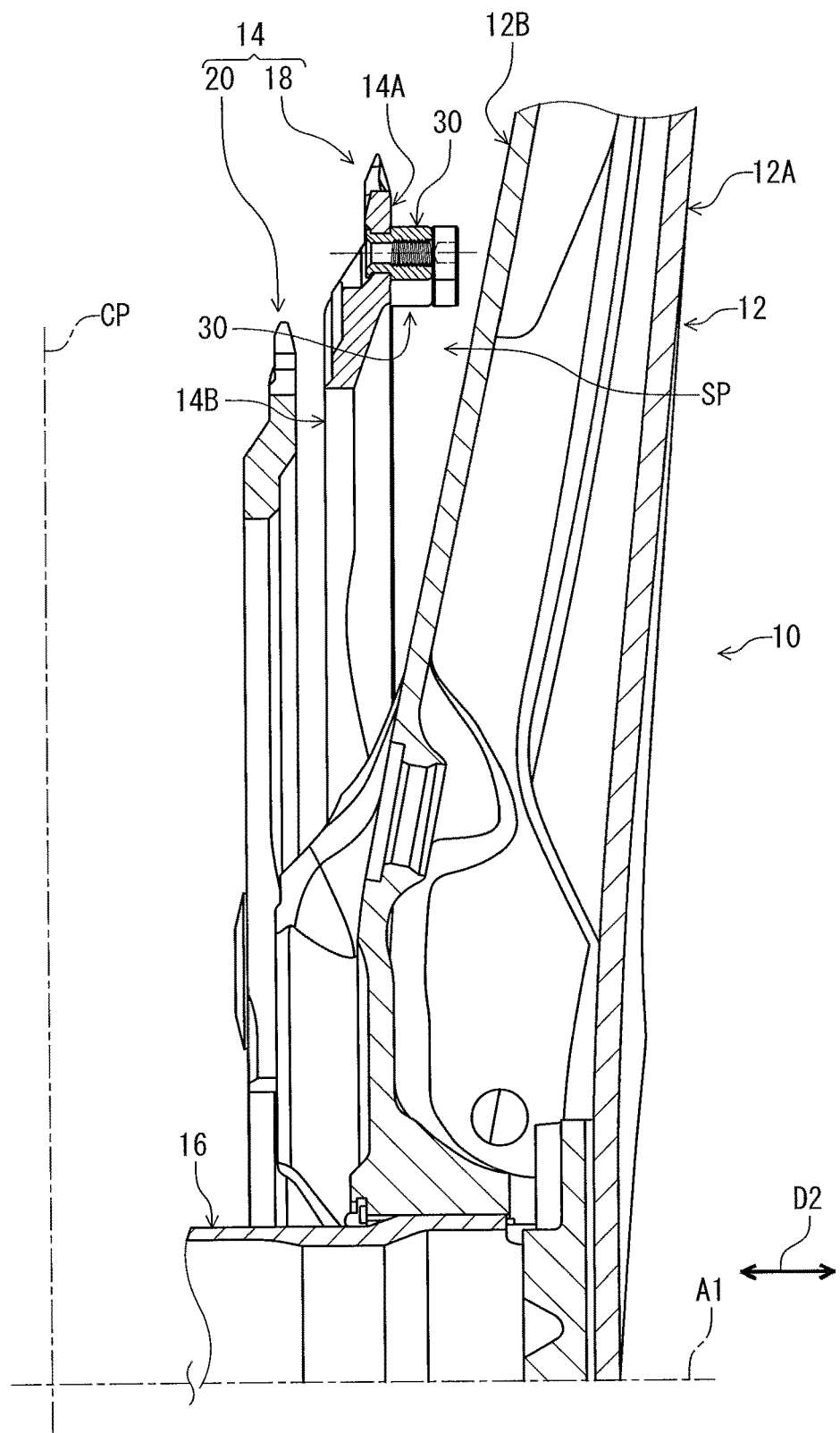
FIG. 5 is a cross-sectional view of the crank assembly taken along line V-V of FIG. 2.

As seen in FIG. 5, the crank arm 12 has an axially outwardly facing crank-surface 12A and an axially inwardly facing crank-surface 12B. The axially inwardly facing crank-surface 12B is provided on a reverse side of the axially outwardly facing crank-surface in the axial direction D2 with respect to the rotational center axis A1 of the crank assembly 10.

The axially inwardly facing crank-surface 12B is configured to face toward an axial center plane CP of the human powered vehicle 2 in the axial direction D2 in a mounted state where the crank assembly 10 is mounted to the human powered vehicle 2. The axial center plane CP is perpendicular to the rotational center axis A1. For example, the axial center plane CP is defined to bisect an axial width of the vehicle body 2A in the axial direction D2.

The front sprocket unit 14 has an axially outwardly facing sprocket-surface 14A and an axially inwardly facing sprocket-surface 14B. The axially inwardly facing sprocket-surface 14B is provided on a reverse side of the axially outwardly facing sprocket-surface 14A in the axial direction D2. The axially inwardly facing sprocket-surface 14B is configured to face toward the axial center plane CP of the human powered vehicle 2 in the axial direction D2 in the mounted state.

The axially inwardly facing crank-surface 12B is configured to face toward the front sprocket unit 14 in the axial direction D2. The axially inwardly facing crank-surface 12B is configured to face toward the axially outwardly facing sprocket-surface 14A of the front sprocket unit 14 in the axial direction D2.

The axially inwardly facing crank-surface 12B is spaced apart from the front sprocket unit 14 in the axial direction D2. The axially inwardly facing crank-surface 12B is spaced apart from the axially outwardly facing sprocket-surface 14A of the front sprocket unit 14 in the axial direction D2.

Figure 6:
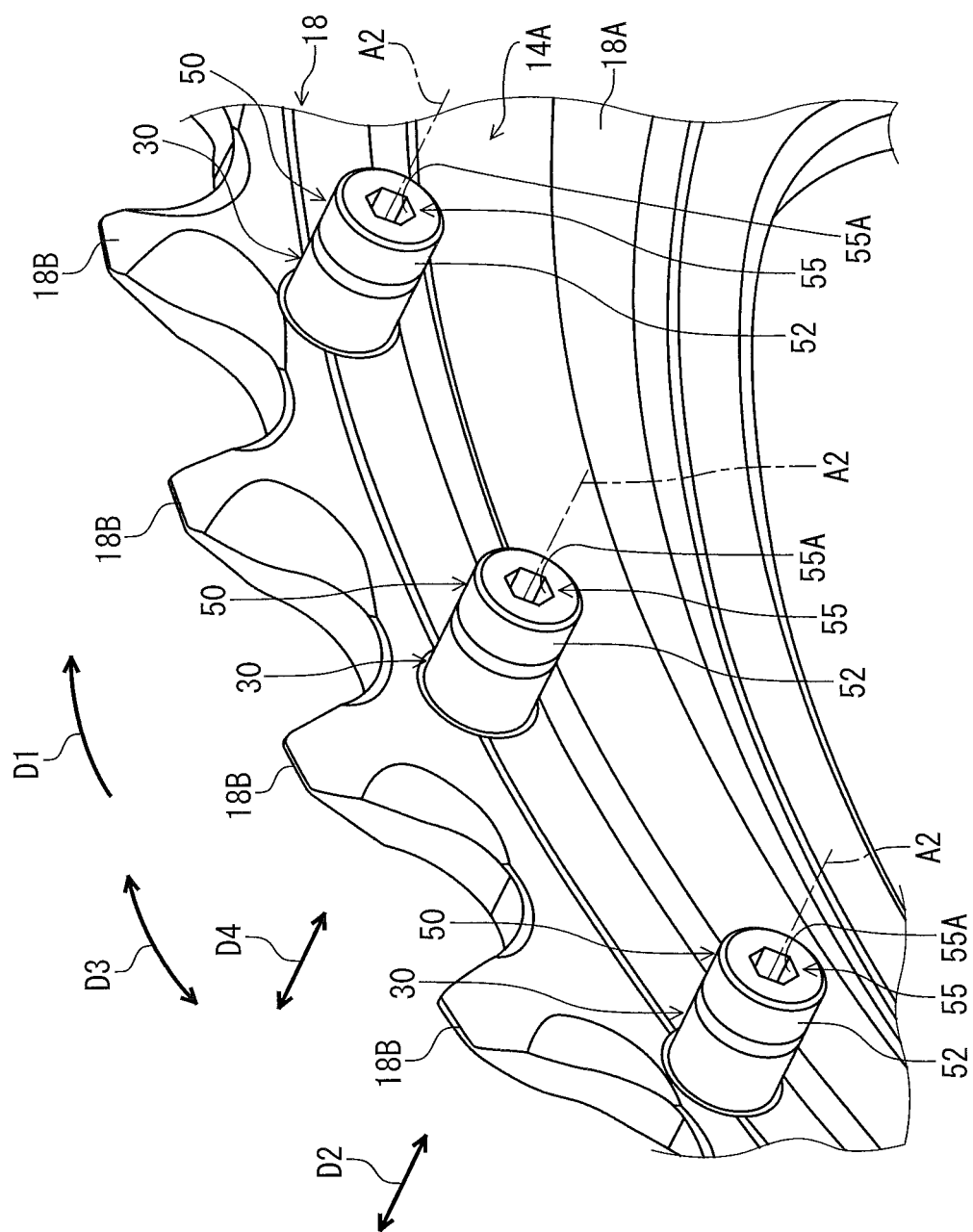
FIG. 6 is a partial perspective view of the crank assembly illustrated in FIG. 1.

As seen in FIG. 6, the crank assembly 10 for the human powered vehicle 2 comprises at least one chain-drop control protrusion 30. In the present embodiment, the at least one chain-drop control protrusion 30 includes a plurality of chain-drop control protrusions 30. Namely, the crank assembly 10 for the human powered vehicle 2 comprises the plurality of chain-drop control protrusions 30.

A total number of the plurality of chain-drop control protrusions 30 is equal to or larger than three. In the present embodiment, the total number of the plurality of chain-drop control protrusions 30 is equal to three. However, the total number of the plurality of chain-drop control protrusions 30 can be larger than or equal to two if needed and/or desired.

As seen in FIG. 5, the at least one chain-drop control protrusion 30 is configured to inhibit the drive chain 4 from getting into a space SP radially inwardly from the at least one control protrusion and between the crank arm 12 and the front sprocket unit 14 in the axial direction D2. The plurality of chain-drop control protrusions 30 is configured to inhibit the drive chain 4 from getting into the space SP provided radially inwardly from the plurality of chain-drop control protrusions 30 and between the crank arm 12 and the front sprocket unit 14 in the axial direction D2.

The at least one chain-drop control protrusion 30 is configured to be provided to at least one of the crank arm 12 and the front sprocket unit 14. The plurality of chain-drop control protrusions 30 is configured to be provided to at least one of the crank arm 12 and the front sprocket unit 14.

The at least one chain-drop control protrusion 30 is configured to be provided to at least one of the axially inwardly facing crank-surface 12B of the crank arm 12 and the axially outwardly facing sprocket-surface 14A of the front sprocket unit 14. The plurality of chain-drop control protrusions 30 is configured to be provided to at least one of the axially inwardly facing crank-surface 12B of the crank arm 12 and the axially outwardly facing sprocket-surface 14A of the front sprocket unit 14.

In the present embodiment, the plurality of chain-drop control protrusions 30 is configured to be provided to the front sprocket unit 14 among the crank arm 12 and the front sprocket unit 14. The plurality of chain-drop control protrusions 30 is configured to be provided to the axially outwardly facing sprocket-surface 14A among the axially inwardly facing crank-surface 12B and the axially outwardly facing sprocket-surface 14A. However, the plurality of chain-drop control protrusions 30 can be configured to be provided to only the crank arm 12 or both of the crank arm 12 and the front sprocket unit 14 if needed and/or desired. The plurality of chain-drop control protrusions 30 can be configured to be provided to the axially inwardly facing crank-surface 12B of the crank arm 12 or both of the axially inwardly facing crank-surface 12B of the crank arm 12 and the axially outwardly facing sprocket-surface 14A of the front sprocket unit 14 if needed and/or desired.

Figure 7:
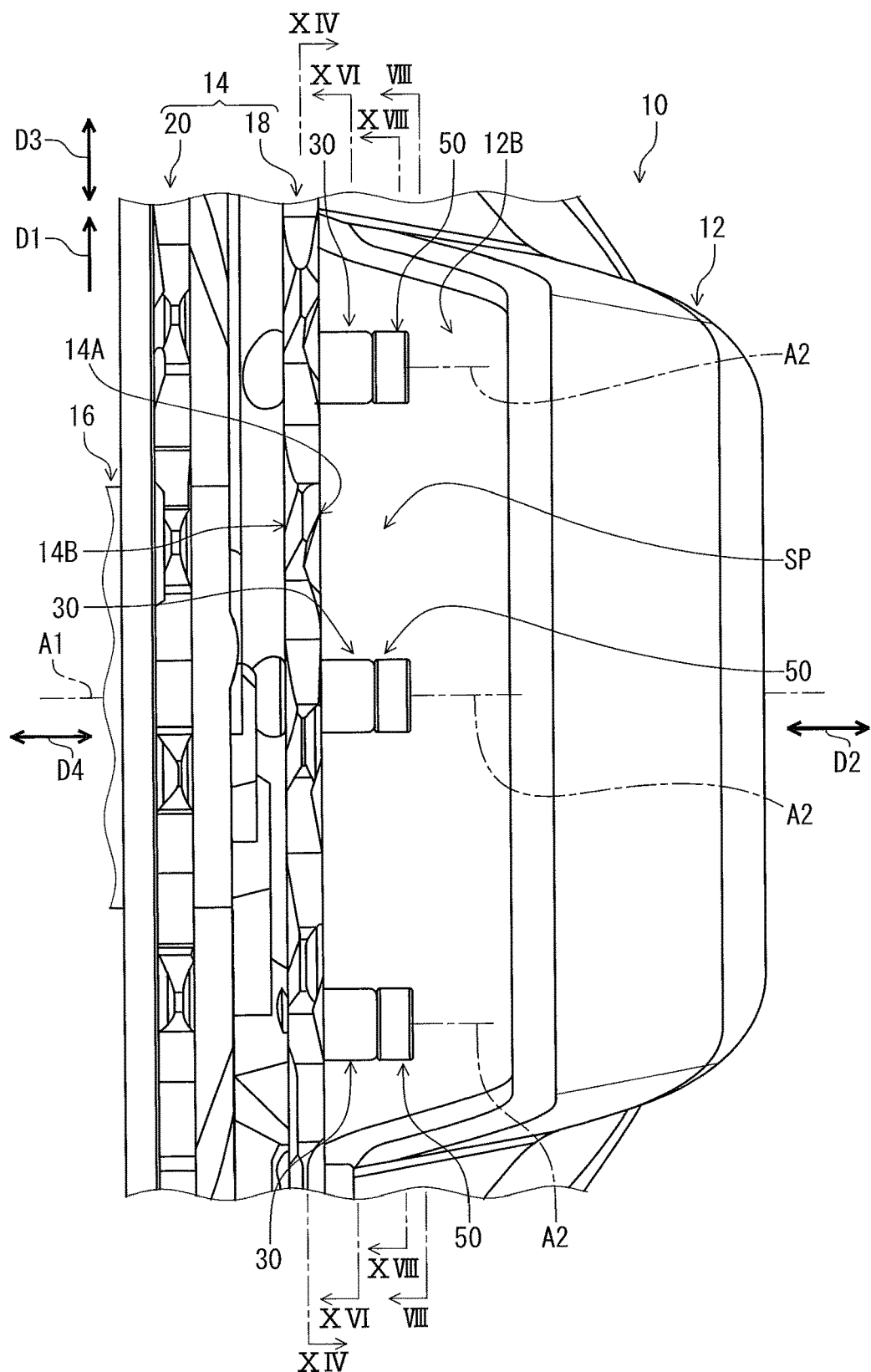
FIG. 7 is a partial top view of the crank assembly illustrated in FIG. 1.
Figure 8:
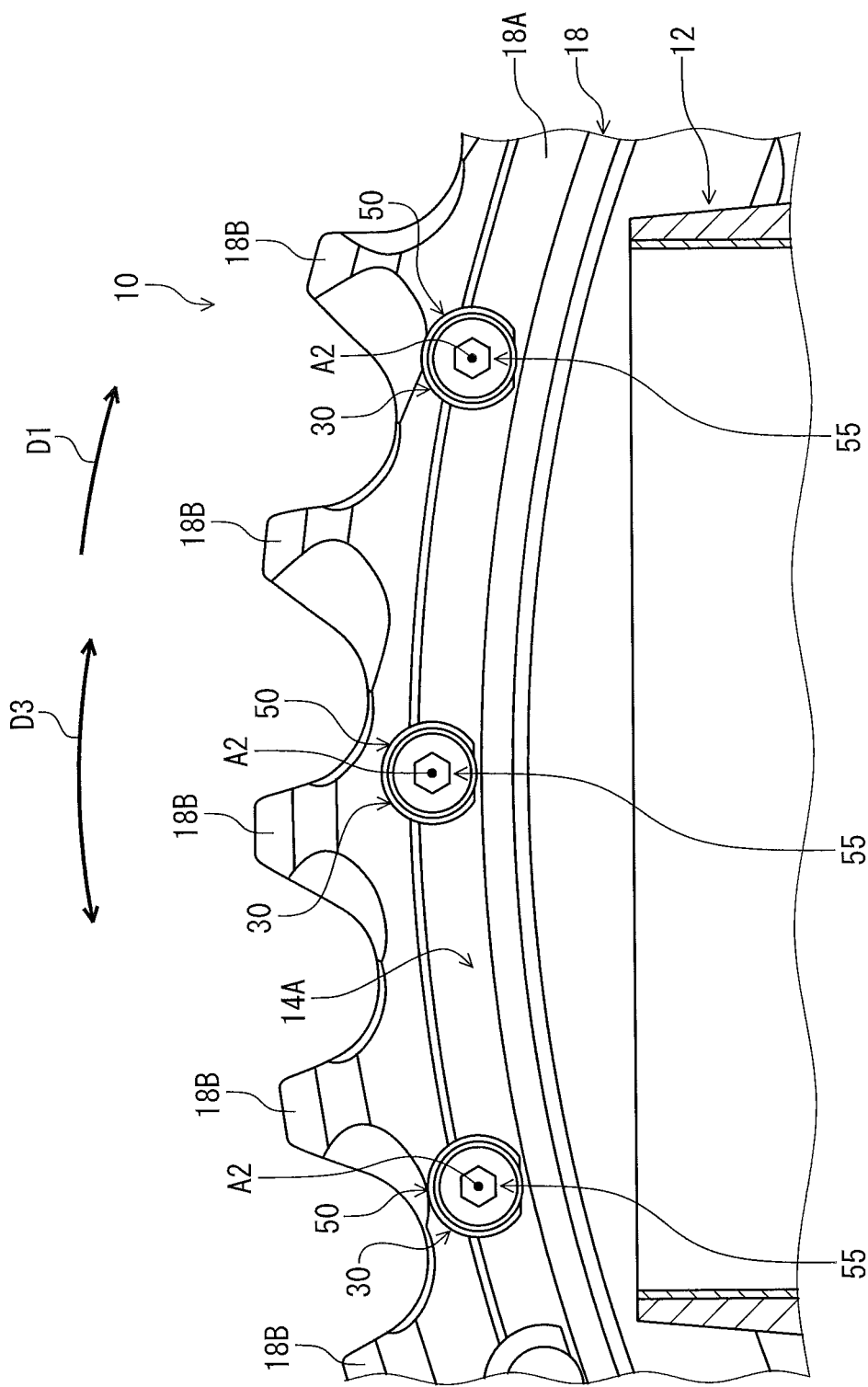
FIG. 8 is a cross-sectional view of the crank assembly taken along line VIII-VIII of FIG. 7.

As seen in FIGS. 7 and 8, the plurality of chain-drop control protrusions 30 is spaced apart from each other in a circumferential direction D3 with respect to the rotational center axis A1. In the present embodiment, the plurality of chain-drop control protrusions 30 is directly coupled to the first front sprocket 18. The plurality of chain-drop control protrusions 30 is directly coupled to the sprocket body 18A of the first front sprocket 18. However, at least one chain-drop control protrusion of the plurality of chain-drop control protrusions 30 can be directly coupled to a cover attached to at least one of the first front sprocket 18 and the second front sprocket 20 if needed and/or desired.

As seen in FIG. 8, the at least one chain-drop control protrusion is disposed radially inwardly from the plurality of sprocket teeth 18B. The plurality of chain-drop control protrusions 30 is at least partially disposed radially inwardly from the sprocket teeth 18B. The plurality of chain-drop control protrusions 30 is entirely disposed radially inwardly from the sprocket teeth 18B. However, the plurality of chain-drop control protrusions 30 can be partially disposed radially inwardly from the sprocket teeth 18B if needed and/or desired. The plurality of chain-drop control protrusions 30 can be at least partially disposed radially outwardly from the sprocket teeth 18B if needed and/or desired.

Figure 9:
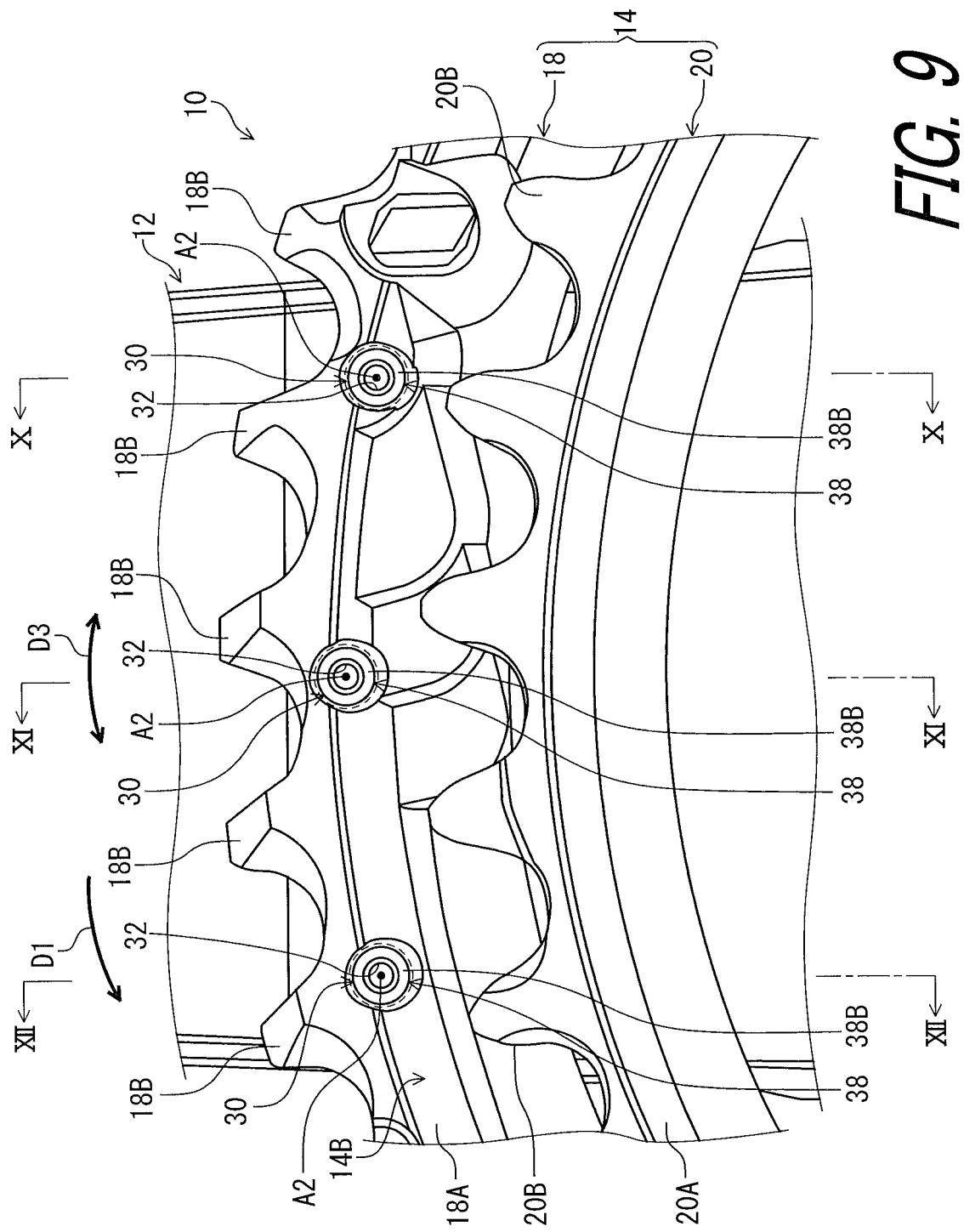
FIG. 9 is a partial side-elevational view of the crank assembly illustrated in FIG. 1.

As seen in FIG. 9, the plurality of chain-drop control protrusions 30 overlaps with the crank arm 12 when viewed from the axial direction D2. However, at least one chain-drip control protrusion of the plurality of chain-drop control protrusions 30 can be provided not to overlap with the crank arm 12 when viewed from the axial direction D2 if needed and/or desired.

Figure 10:
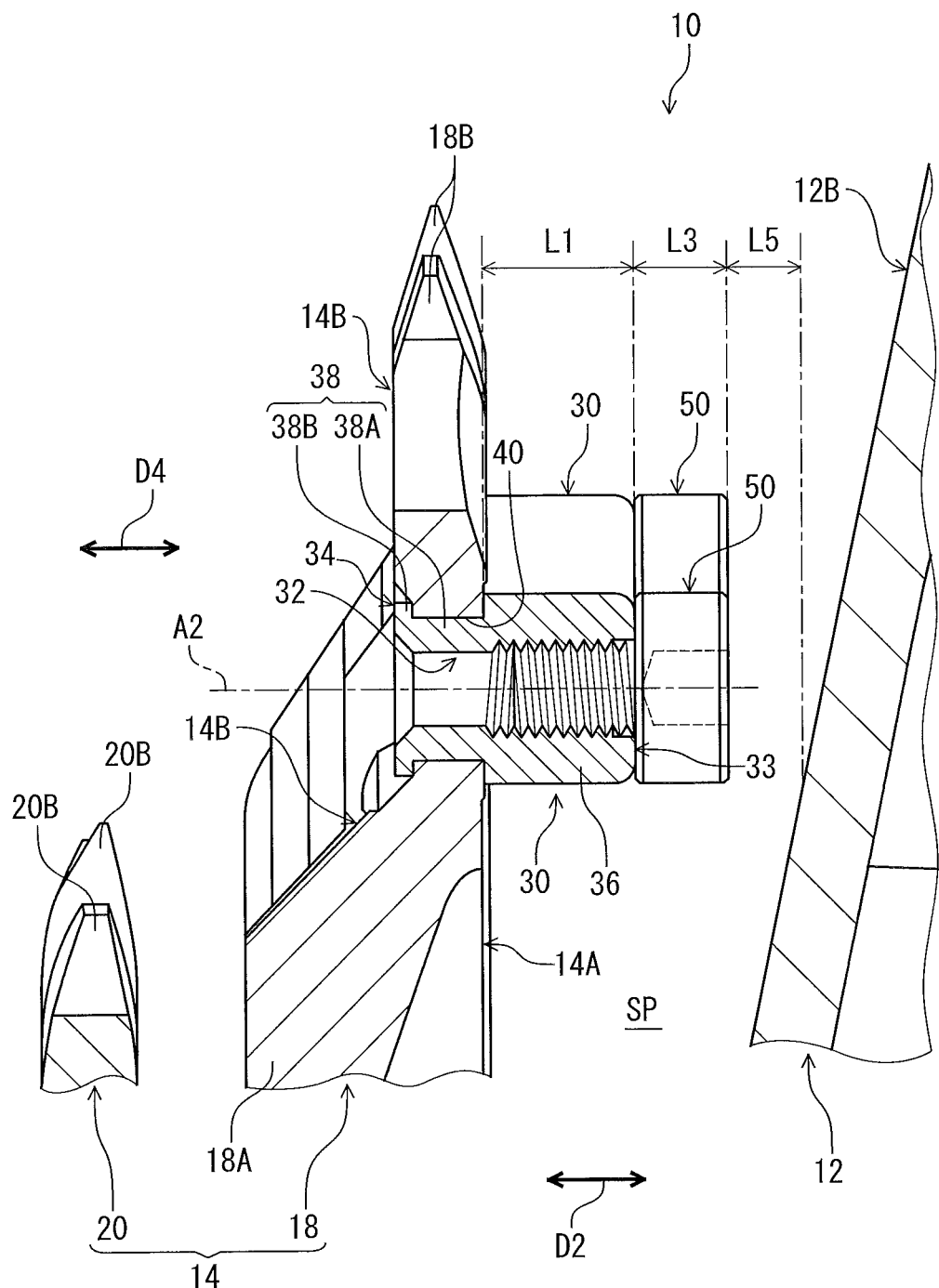
FIG. 10 is a partial cross-sectional view of the crank assembly taken along line X-X of FIG. 9.
Figure 11:
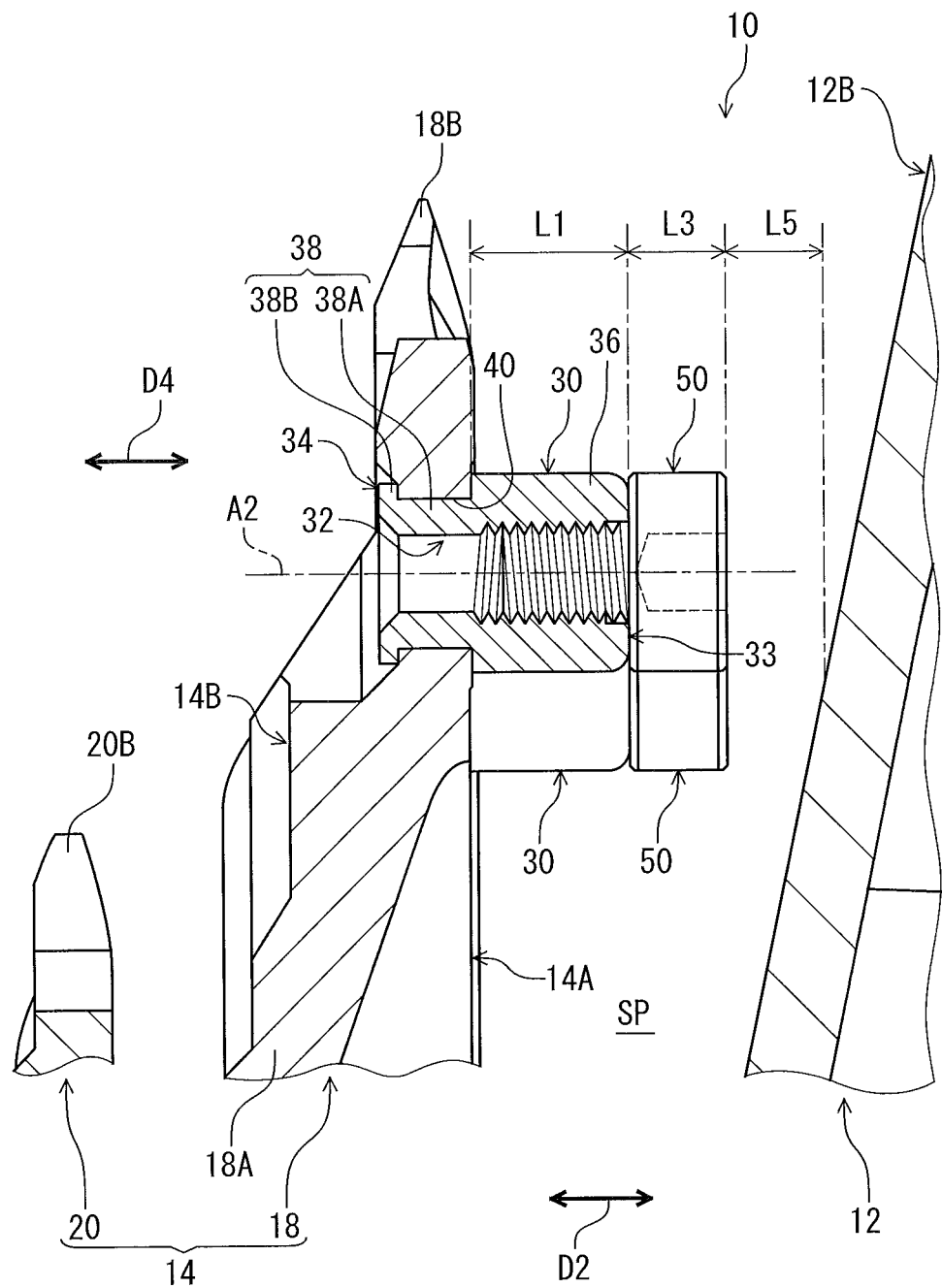
FIG. 11 is a partial cross-sectional view of the crank assembly taken along line XI-XI of FIG. 9.
Figure 12:
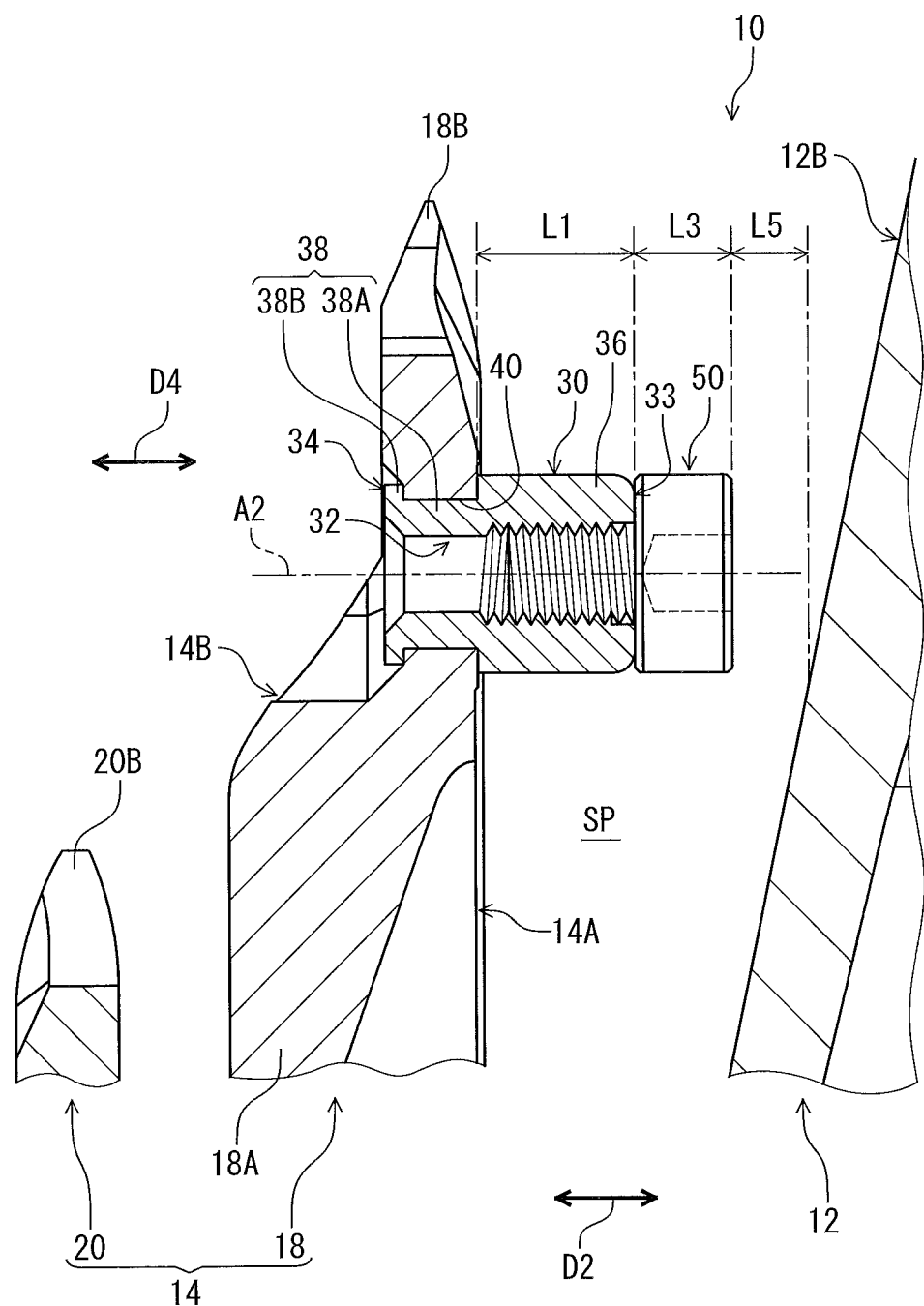
FIG. 12 is a partial cross-sectional view of the crank assembly taken along line XII-XII of FIG. 9.

As seen in FIGS. 10 to 12, the at least one chain-drop control protrusion 30 has a through bore 32. At least one chain-drop control protrusion of the plurality of chain-drop control protrusions 30 has the through bore 32. In the present embodiment, each chain-drop control protrusion of the plurality of chain-drop control protrusions 30 has the through bore 32. However, the through bore 32 can be omitted from at least one chain-drop control protrusion of the plurality of chain-drop control protrusions 30 if needed and/or desired.

The at least one chain-drop control protrusion 30 has a free end 33 and an attachment end 34. In the present embodiment, each chain-drop control protrusion of the plurality of chain-drop control protrusions 30 has the free end 33 and the attachment end 34. The through bore 32 has a bore center-axis A2. The bore center-axis A2 extends from one of the free end 33 and the attachment end 34 to the other of the free end 33 and the attachment end 34. The attachment end 34 is configured to be coupled to the at least one of the axially inwardly facing crank-surface 12B of the crank arm 12 and the axially outwardly facing sprocket-surface 14A of the front sprocket unit 14. The through bore 32 can be formed so that the through bore 32 extends to intersect with a direction parallel to the bore center axis A2 illustrated in FIGS. 10 to 12.

In the present embodiment, the attachment end 34 is configured to be coupled to the axially outwardly facing sprocket-surface 14A of the front sprocket unit 14 among the axially inwardly facing crank-surface 12B and the axially outwardly facing sprocket-surface 14A. However, the attachment end 34 can be configured to be coupled to only the axially inwardly facing crank-surface 12B of the crank arm 12 or both of the axially inwardly facing crank-surface 12B of the crank arm 12 and the axially outwardly facing sprocket-surface 14A of the front sprocket unit 14 if needed and/or desired.

The at least one chain-drop control protrusion 30 has a chain-drop control section 36 and an attachment section 38. In the present embodiment, each chain-drop control protrusion of the plurality of chain-drop control protrusions 30 has the chain-drop control section 36 and the attachment section 38. The attachment section 38 is adjacent to the chain-drop control section 36 in a bore axial direction D4 with respect to the bore center-axis A2. The attachment section 38 extends from the chain-drop control section 36 in the bore axial direction D4. The chain-drop control section 36 includes the free end 33. The attachment section 38 includes the attachment end 34. The chain-drop control section 36 is contactable with the drive chain 4 when the drive chain 4 drops off from the front sprocket unit 14 (e.g., the first front sprocket 18). The attachment section 38 is secured to the front sprocket unit 14 (e.g., the first front sprocket 18).

In the present embodiment, the chain-drop control section 36 is integrally provided with the attachment section 38 as a one-piece unitary member. However, the chain-drop control section 36 can be a separate member from the attachment section 38 if needed and/or desired.

Figure 13:
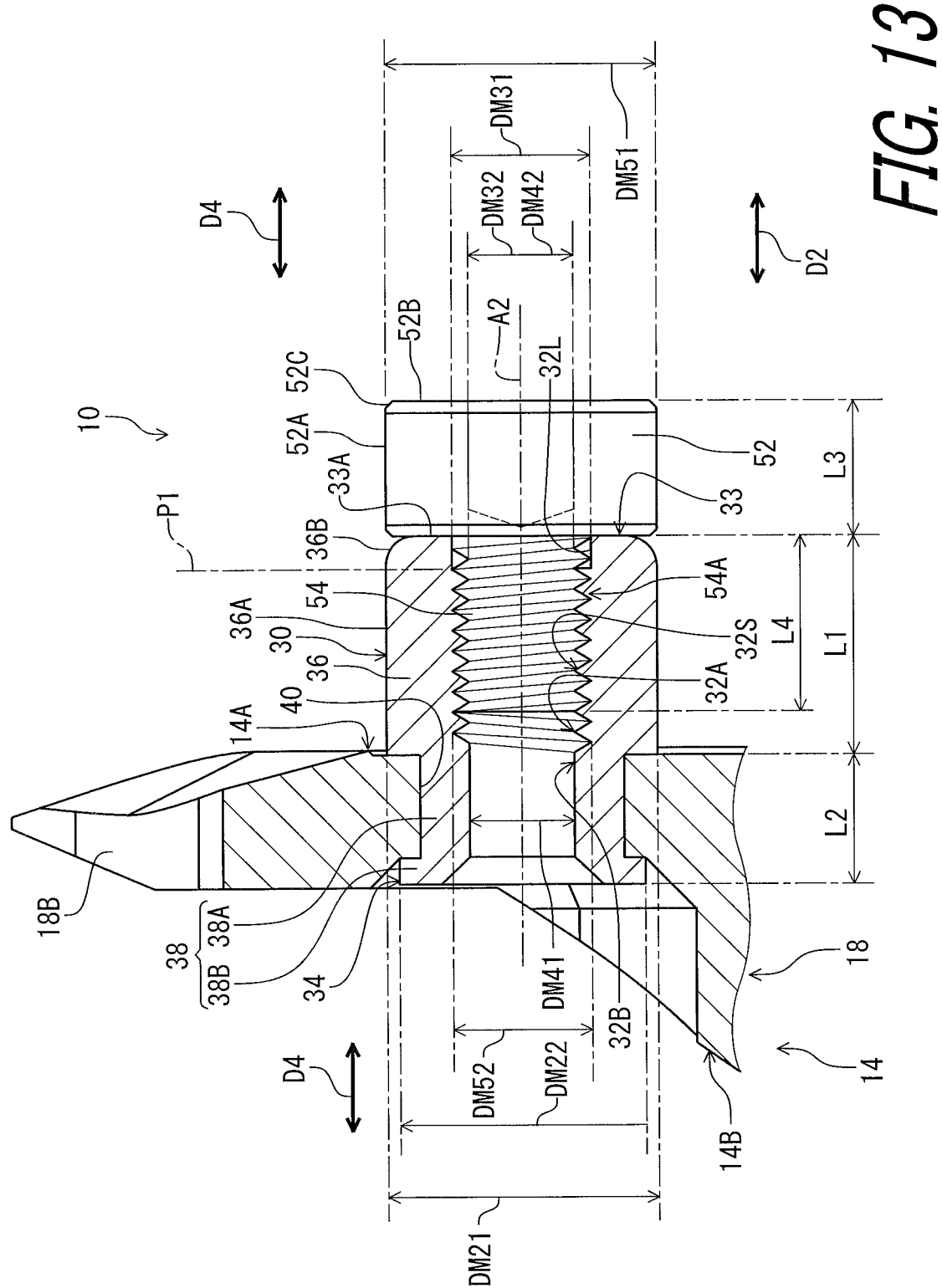
FIG. 13 is an enlarged partial cross-sectional view of the crank assembly illustrated in FIG. 12.

As seen in FIG. 13, the front sprocket unit 14 includes an attachment hole 40. The first front sprocket 18 includes the attachment hole 40. The sprocket body 18A includes the attachment hole 40. The attachment section 38 is at least partially provided in the attachment hole 40. The attachment section 38 extends through the attachment hole 40. The chain-drop control section 36 is provided outside the attachment hole 40. In the present embodiment, the attachment section 38 is partially provided in the attachment hole 40. However, the attachment section 38 can be entirely provided in the attachment hole 40 if needed and/or desired.

The attachment section 38 includes a first attachment section 38A and a second attachment section 38B. The second attachment section 38B includes the attachment end 34. The first attachment section 38A is provided in the attachment hole 40. The second attachment section 38B is provided outside the attachment hole 40. The second attachment section 38B has an outer diameter larger than an outer diameter of the first attachment section 38A. For example, the second attachment section 38B is formed by being swaged. However, the second attachment section 38B can be formed by other methods. The second attachment section 38B can be omitted from the attachment section 38 e.g. if the attachment section 38 is coupled to the attachment hole 40 by an adhesive agent or in a press-fitting manner.

The chain-drop control section 36 has a first maximum diameter DM21 with respect to the bore center-axis A2. The attachment section 38 has a second maximum diameter DM22 with respect to the bore center-axis A2. The second maximum diameter DM22 is defined by the second attachment section 38B. In the present embodiment, the first maximum diameter DM21 is larger than the second maximum diameter DM22. A ratio of the first maximum diameter DM21 to the second maximum diameter DM22 is greater than or equal to 1.2. In the present embodiment, the first maximum diameter DM21 is equal to 4 mm. The second maximum diameter DM22 is equal to 3 mm. The ratio of the first maximum diameter DM21 to the second maximum diameter DM22 is equal to 1.33. However, the ratio of the first maximum diameter DM21 to the second maximum diameter DM22 is not limited to the above ratio and range. The first maximum diameter DM21 is not limited to the above diameter. The second maximum diameter DM22 is not limited to the above diameter.

The chain-drop control section 36 has a first axial length L1 with respect to the bore center-axis A2. The attachment section 38 has a second axial length L2 with respect to the bore center-axis A2. The first axial length L1 is larger than the second axial length L2. A ratio of the first axial length L1 to the second axial length L2 is greater than or equal to 1.5. In the present embodiment, the first axial length L1 is equal to 3.2 mm. The second axial length L2 is equal to 2 mm. The ratio of the first axial length L1 to the second axial length L2 is equal to 1.6. However, the ratio of the first axial length L1 to the second axial length L2 is not limited to the above ratio and range. The first axial length L1 is not limited to the above length. The second axial length L2 is not limited to the above length.

As seen in FIG. 13, the chain-drop control section 36 has a radially outermost surface 36A with respect to the bore center-axis A2. The free end 33 has an axial free-end surface 33A with respect to the bore center-axis A2. The chain-drop control section 36 has a chamfered portion 36B. The chamfered portion 36B is provided between the radially outermost surface 36A and the axial free-end surface 33A.

The chamfered portion 36B has a curvature. The chamfered portion 36B includes a curved surface. The curved surface includes a curved convex surface. The curved surface has the curvature. However, the shape of the chamfered portion 36B is not limited to the illustrated embodiment. The chamfered portion 36B can include surfaces (e.g., a flat surface) other than the curved surface having the curvature if needed and/or desired.

The through bore 32 has a threaded portion 32A. The threaded portion 32A is provided at least in the chain-drop control section 36 of the at least one chain-drop control protrusion 30. The threaded portion 32A includes an internal thread. In the present embodiment, the threaded portion 32A is entirely provided in the chain-drop control section 36. However, the threaded portion 32A can be partially provided in the chain-drop control section 36 if needed and/or desired.

As seen in FIG. 13, the through bore 32 has a large diameter bore 32L and a small diameter bore 32S connected to the large diameter bore 32L. The large diameter bore 32L extends from the free end 33 in the bore axial direction D4 with respect to the bore center-axis A2. The small diameter bore 32S extends from the attachment end 34 in the bore axial direction D4. The large diameter bore 32L has a large diameter DM31. The small diameter bore 32S has a small diameter DM32. The small diameter DM32 of the small diameter bore 32S is smaller than the large diameter DM31 of the large diameter bore 32L. A ratio of the large diameter DM31 to the small diameter DM32 is greater than or equal to 1.3.

In the present embodiment, the large diameter DM31 is equal to 2.1 mm. The small diameter DM32 is equal to 1.6 mm. The ratio of the large diameter DM31 to the small diameter DM32 is equal to 1.31. However, the ratio of the large diameter DM31 to the small diameter DM32 is not limited to the above ratio and range. The large diameter DM31 is not limited to the above length. The small diameter DM32 is not limited to the above length.

The large diameter bore 32L and the small diameter bore 32S are connected to each other at a connecting point P1. The threaded portion 32A extends from the connecting point P1 along the bore axial direction D4 in the small diameter bore 32S. The connecting point P1 is located in the chain-drop control section 36. However, the connecting point P1 can be located in the attachment section 38 if needed and/or desired.

The through bore 32 has a non-threaded portion 32B provided in the attachment section 38. The non-threaded portion 32B is adjacent to the threaded portion 32A. The non-threaded portion 32B has a non-threaded internal diameter DM41 that is equal to an internal minor diameter DM42 of the threaded portion 32A. The non-threaded internal diameter DM41 and the internal minor diameter DM42 are equal to the small diameter DM32 of the small diameter bore 32S. However, at least one of the non-threaded internal diameter DM41 and the internal minor diameter DM42 can be different from the small diameter DM32 of the small diameter bore 32S if needed and/or desired. The non-threaded internal diameter DM41 can be different from the internal minor diameter DM42 if needed and/or desired.

As seen in FIG. 13, the crank assembly 10 further comprises an additional chain-drop control protrusion 50. The additional chain-drop control protrusion 50 is configured to threadedly engage with the threaded portion 32A of the through bore 32. The additional chain-drop control protrusion 50 includes a head 52 and a rod 54. The head 52 is provided at an end of the rod 54. The rod 54 includes an additional threaded portion 54A. The additional threaded portion 54A is configured to threadedly engage with the threaded portion 32A of the through bore 32. For example, the additional threaded portion 54A includes an external thread.

In the present embodiment, the additional chain-drop control protrusion 50 is configured to be attached to the chain-drop control protrusion 30 with the threaded portion 32A and the additional threaded portion 54A. However, the additional chain-drop control protrusion 50 can be configured to be attached to the chain-drop control protrusion 30 with other structures such as an adhesive agent and press-fitting. In such modifications, the threaded portion 32A can be omitted from the through bore 32 if needed and/or desired. The additional threaded portion 54A can be omitted from the rod 54 of the additional chain-drop control protrusion 50 if needed and/or desired.

The head 52 has a radially outermost surface 52A, an axial end surface 52B, and a chamfered portion 52C. The chamfered portion 36B is provided between the radially outermost surface 52A and the axial end surface 52B. However, the chamfered portion 52C can be omitted from the head 52 if needed and/or desired.

As seen in FIG. 6, the additional chain-drop control protrusion 50 includes a tool engagement portion 55. The tool engagement portion 55 is provided to the head 52. The tool engagement portion 55 includes a tool engagement hole 55A. In the present embodiment, the tool engagement hole 55A includes a hexagonal hole. Namely, the additional chain-drop control protrusion 50 includes a hexagonal socket screw. However, the tool engagement portion 55 can be omitted from the additional chain-drop control protrusion 50 if needed and/or desired. The tool engagement portion 55 can include structures other than the hexagonal hole if needed and/or desired.

As seen in FIG. 13, the head 52 has a first outer diameter DM51. The rod 54 has a second additional outer diameter DM52. For example, the second additional outer diameter DM52 is an external major diameter of the additional threaded portion 54A. The first outer diameter DM51 of the head 52 is larger than the second additional outer diameter DM52 of the rod 54. The first outer diameter DM51 of the head 52 is equal to the first maximum diameter DM21 of the chain-drop control section 36. The first outer diameter DM51 of the head 52 is larger than the second maximum diameter DM22 of the attachment section 38. The second additional outer diameter DM52 of the rod 54 is smaller than the first maximum diameter DM21 of the chain-drop control section 36 and the second maximum diameter DM22 of the attachment section 38.

However, the first outer diameter DM51 of the head 52 can be smaller than or equal to the second additional outer diameter DM52 of the rod 54 if needed and/or desired. The first outer diameter DM51 of the head 52 can be different from the first maximum diameter DM21 of the chain-drop control section 36 if needed and/or desired. The first outer diameter DM51 of the head 52 can be different from the first maximum diameter DM21 of the chain-drop control section 36 if needed and/or desired. The first outer diameter DM51 of the head 52 can be smaller or larger than the first maximum diameter DM21 of the chain-drop control section 36 if needed and/or desired. The first outer diameter DM51 of the head 52 can be smaller than or equal to the second maximum diameter DM22 of the attachment section 38 if needed and/or desired.

The head 52 has a third axial length L3. The rod 54 has a fourth axial length L4. The third axial length L3 is defined in the bore axial direction D4. The fourth axial length L4 is defined in the bore axial direction D4. In the present embodiment, the fourth axial length L4 is longer than the third axial length L3. The first axial length L1 of the chain-drop control section 36 is longer than the third axial length L3 and the fourth axial length L4. The second axial length L2 of the attachment section 38 is shorter than the third axial length L3 and the fourth axial length L4. However, the fourth axial length L4 can be shorter than or equal to the third axial length L3 if needed and/or desired. The first axial length L1 of the chain-drop control section 36 can be shorter than or equal to at least one of the third axial length L3 and the fourth axial length L4 if needed and/or desired. The second axial length L2 of the attachment section 38 can be longer than or equal to the third axial length L3 and the fourth axial length L4 if needed and/or desired.

As seen in FIGS. 10 to 12, the first axial length L1 of the chain-drop control section 36 is longer than a minimum distance L5 defined between the additional chain-drop control protrusion 50 and the crank arm 12 in the bore axial direction D4. A total of the first axial length L1 and the third axial length L3 is longer than the minimum distance L5. However, the first axial length L1 of the chain-drop control section 36 can be shorter than or equal to the minimum distance L5 if needed and/or desired. The total of the first axial length L1 and the third axial length L3 can be shorter than or equal to the minimum distance L5 if needed and/or desired.

Figure 14:
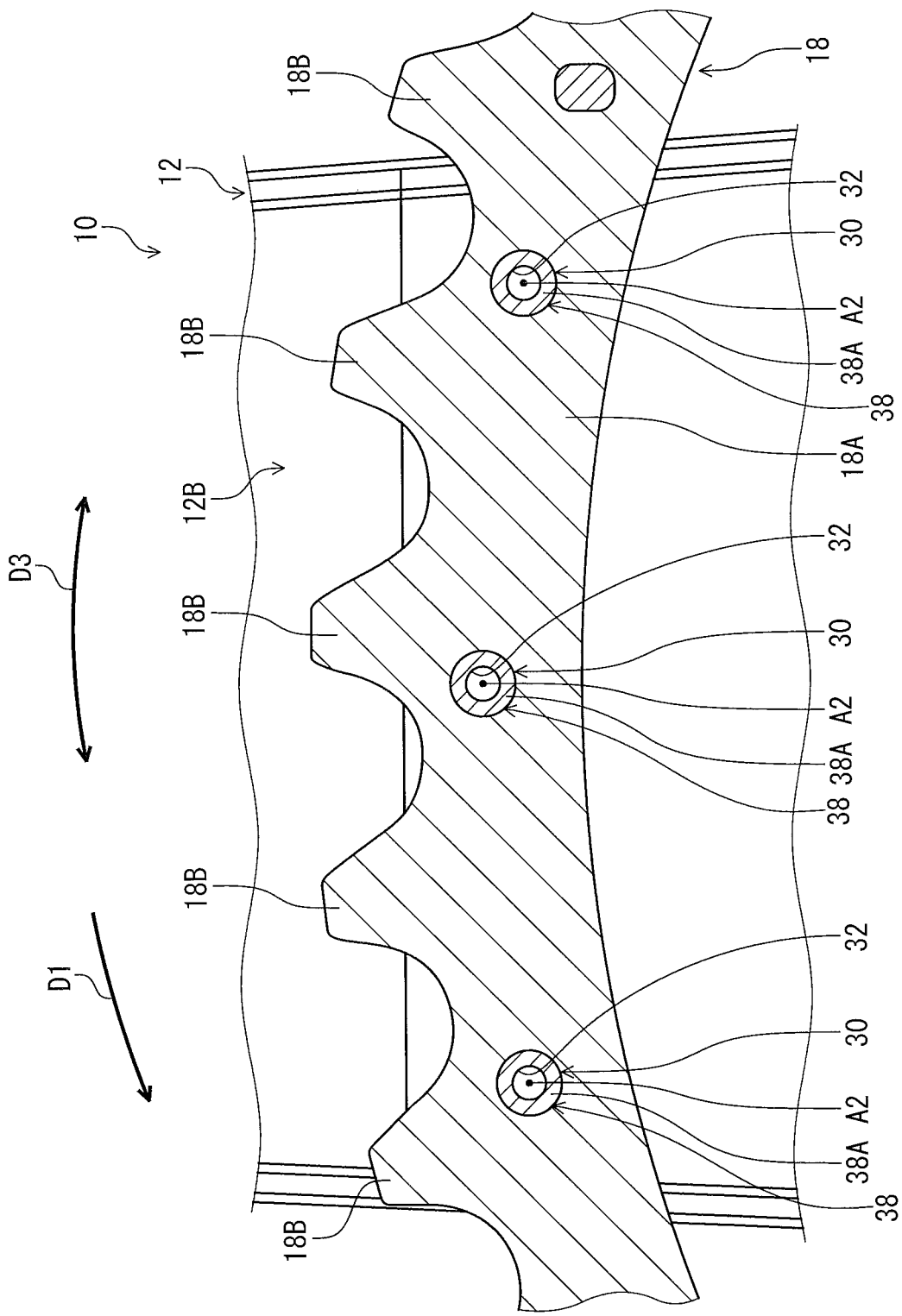
FIG. 14 is a partial cross-sectional view of the crank assembly taken along line XIV-XIV of FIG. 7.
Figure 15:
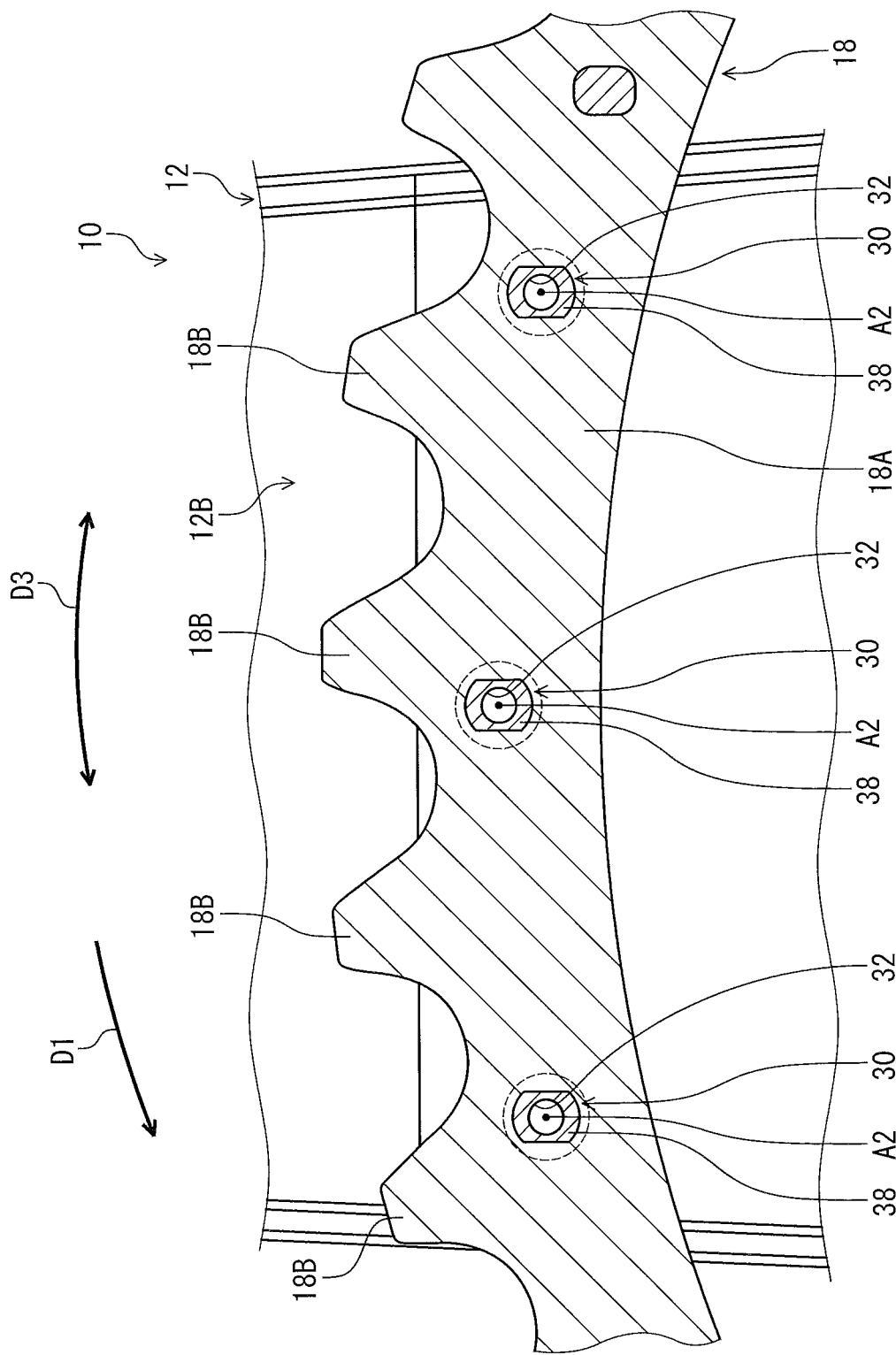
FIG. 15 is a partial cross-sectional view of the crank assembly in accordance with a modification.

As seen in FIGS. 9 and 14, the attachment section 38 has a circular cross-sectional shape. As seen in FIG. 9, the second attachment section 38B has a circular cross-sectional shape. As seen in FIG. 14, the first attachment section 38A has a circular cross-sectional shape. The attachment hole 40 has a circular shape. As seen in FIG. 15, however, the attachment section 38 can have a non-circular cross-sectional shape if needed and/or desired. At least one of the first attachment section 38A and the second attachment section 38B can have shapes other than a circular cross-sectional shape if needed and/or desired. The non-circular cross-sectional shape of the first attachment section 38A restricts the chain-drop control protrusion 30 from rotating relative to the front sprocket unit 14.

Figure 16:
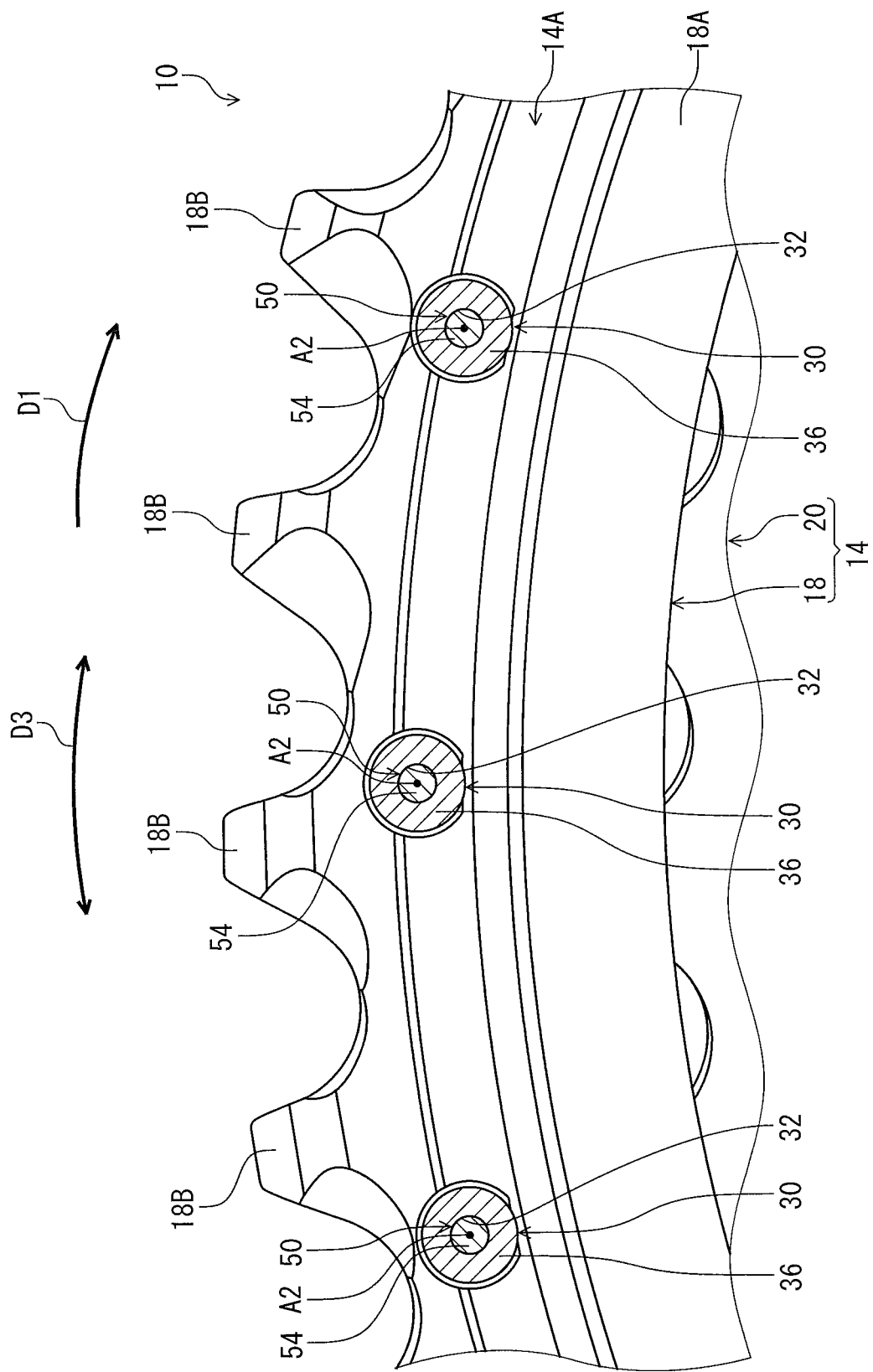
FIG. 16 is a partial cross-sectional view of the crank assembly taken along line XVI-XVI of FIG. 7.

As seen in FIG. 16 the chain-drop control section 36 has a circular cross-sectional shape. However, the chain-drop control section 36 can have a non-circular cross-sectional shape if needed and/or desired.

Figure 17:
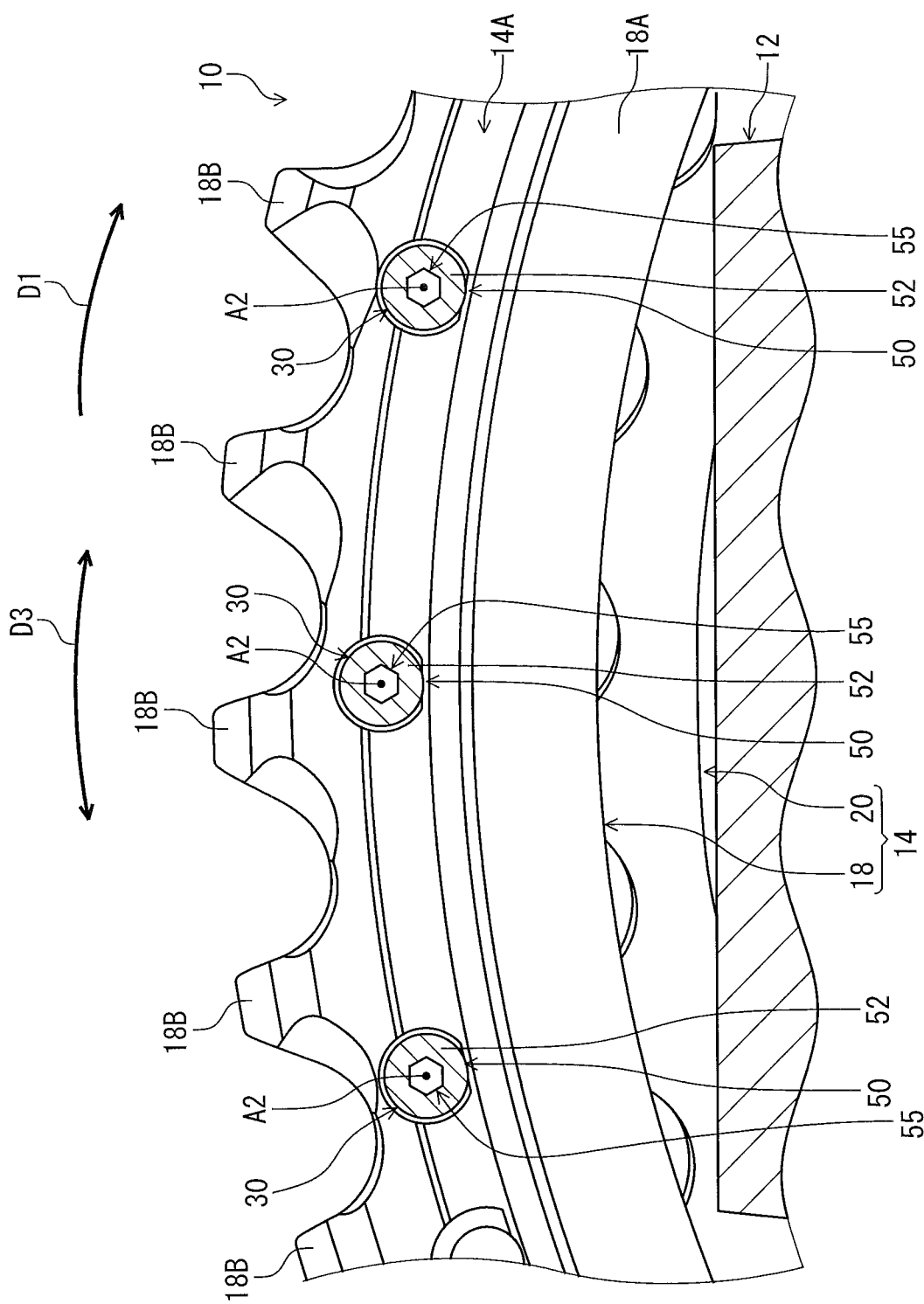
FIG. 17 is a partial cross-sectional view of the crank assembly taken along line XVII-XVII of FIG. 7.

As seen in FIG. 17 the additional chain-drop control protrusion 50 has a circular cross-sectional shape. However, the chain-drop control section 36 can have a non-circular cross-sectional shape if needed and/or desired.

Second Embodiment

A crank assembly 210 in accordance with a second embodiment will be described below referring to FIGS. 18 to 20. The crank assembly 210 has the same structure and/or configuration as those of the crank assembly 10 except for an electrical component and the additional chain-drop control protrusion 50. Thus, elements having substantially the same function as those in the first embodiment will be numbered the same here and will not be described and/or illustrated again in detail here for the sake of brevity.

Figure 18:
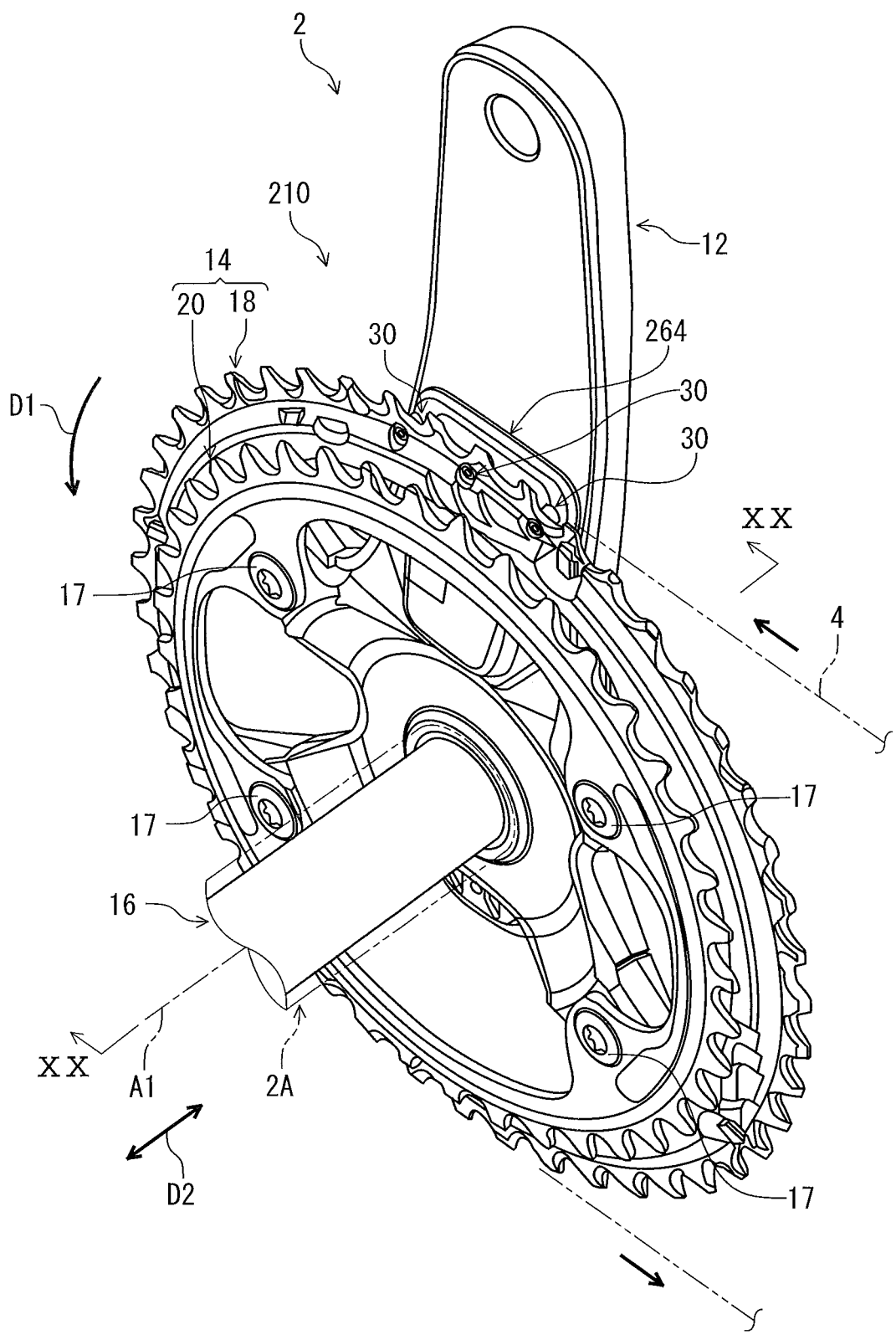
FIG. 18 is a perspective view of a crank assembly in accordance with a second embodiment.

As seen in FIG. 18, the crank assembly 210 for the human powered vehicle 2 comprises the crank arm 12 and the front sprocket unit 14. The crank assembly 210 comprises the crank axle 16.

Figure 19:
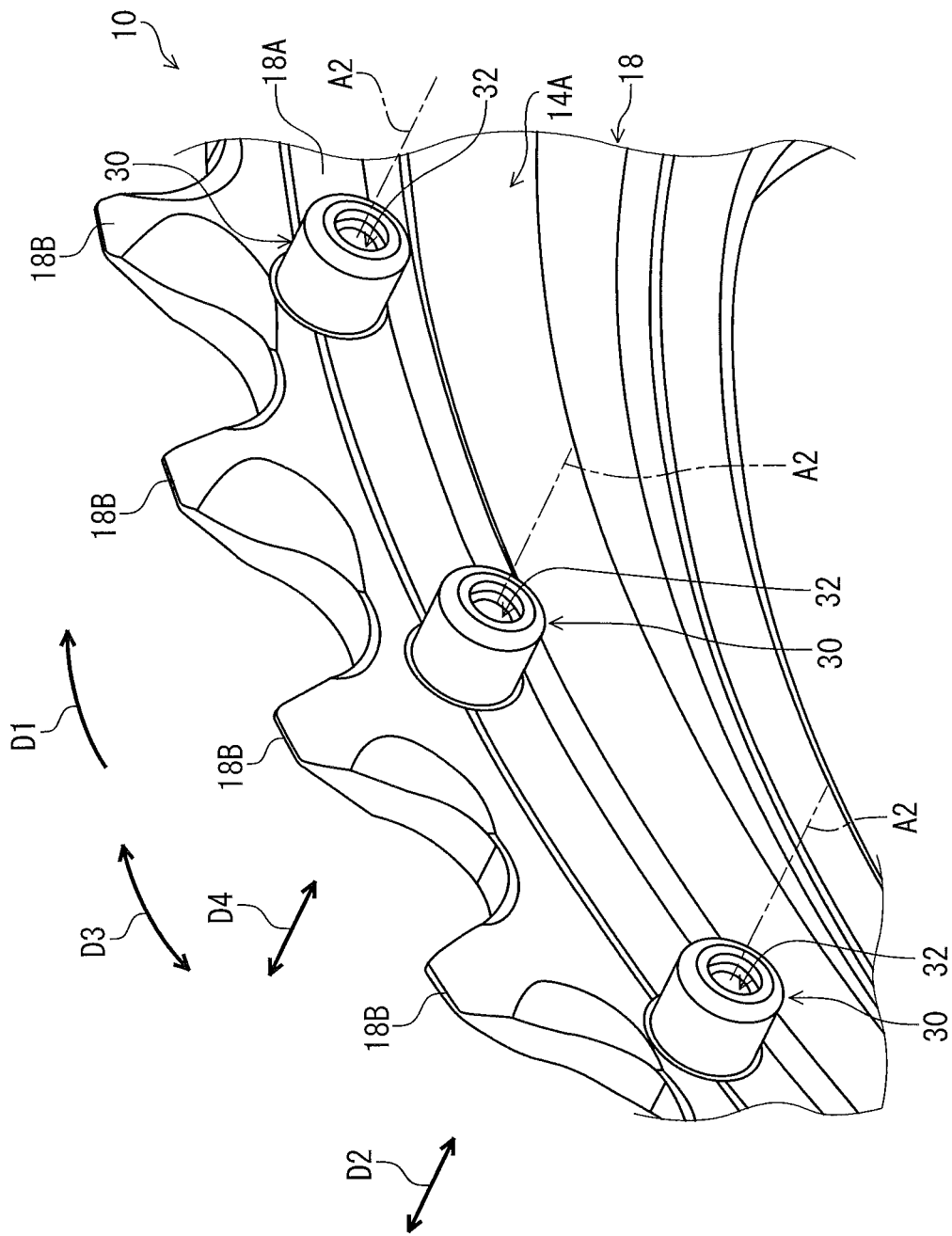
FIG. 19 is a partial perspective view of the crank assembly illustrated in FIG. 18.

As seen in FIG. 19, the crank assembly 210 for the human powered vehicle 2 comprises the at least one chain-drop control protrusion 30. The at least one chain-drop control protrusion 30 includes the plurality of chain-drop control protrusions 30. In the second embodiment, the additional chain-drop control protrusion 50 is omitted from the crank assembly 210. However, the crank assembly 210 can include the additional chain-drop control protrusion 50 if needed and/or desired.

Figure 20:
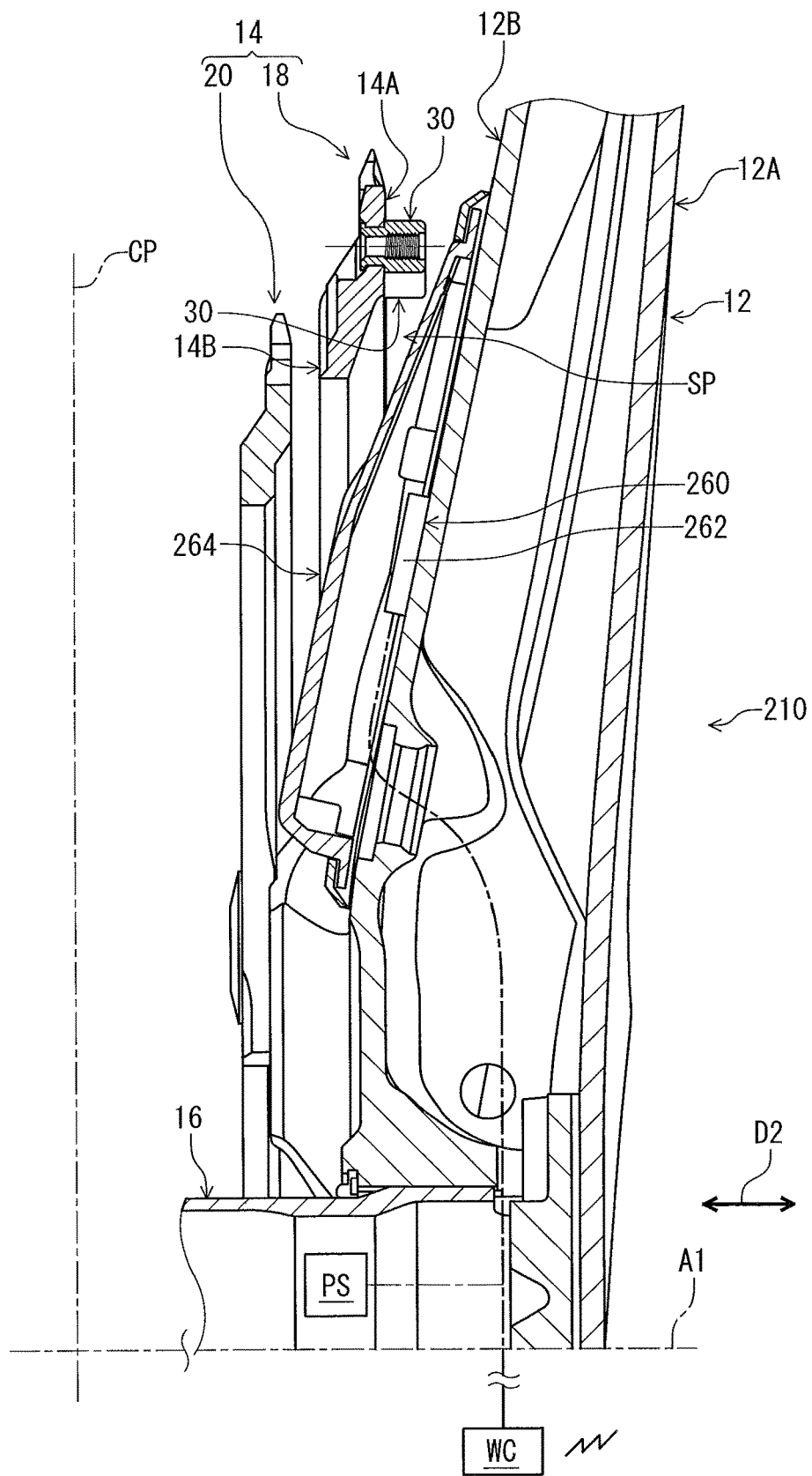
FIG. 20 is a partial cross-sectional view of the crank assembly taken along line XX-XX of FIG. 18.

As seen in FIG. 20, the crank assembly 210 further comprises an electrical component 260. The electrical component 260 is provided to the crank arm 12 at a location radially inwardly from the plurality of chain-drop control protrusions 30. In the present embodiment, the electrical component 260 includes a force sensor 262. The force sensor 262 is configured to sense force applied to the crank arm 12. The force sensor 262 includes a strain gauge attached to the crank arm 12. However, the force sensor 262 can include sensors other than the strain gauge if needed and/or desired. The electrical component 260 can include a component other than the force sensor 262 if needed and/or desired.

The crank assembly 210 further comprises a wireless communicator WC and an electric power source PS. The wireless communicator WC is electrically connected to the electrical component 260. The wireless communicator WC is electrically connected to the force sensor 262. The wireless communicator WC is configured to wirelessly communicate with an additional wireless communicator. For example, the wireless communicator WC is configured to wirelessly transmit to the additional wireless communicator data sensed by the force sensor 262.

The electric power source PS is electrically connected to the electrical component 260 and the wireless communicator WC to supply electricity to the electrical component 260 and the wireless communicator WC. For example, the electric power source PS is configured to be provided in the crank axle 16. The electric power source PS includes a battery. However, the electric power source PS can be provided in positions other than the inside of the crank axle 16 if needed and/or desired. The electric power source PS can include components other than the battery if needed and/or desired.

The crank assembly 210 further comprises a cover member 264. The cover member 264 is configured to be attached to the axially inwardly facing crank-surface 12B of the crank arm 12 so as to cover the electrical component 260 in an assembled state of the crank assembly 210.

In the present embodiment, the cover member 264 is made of a non-metallic material. The cover member 264 is made of a resin material such as synthetic resin. However, the cover member 264 can be made of materials other than the non-metallic material if needed and/or desired.

Figure 21:
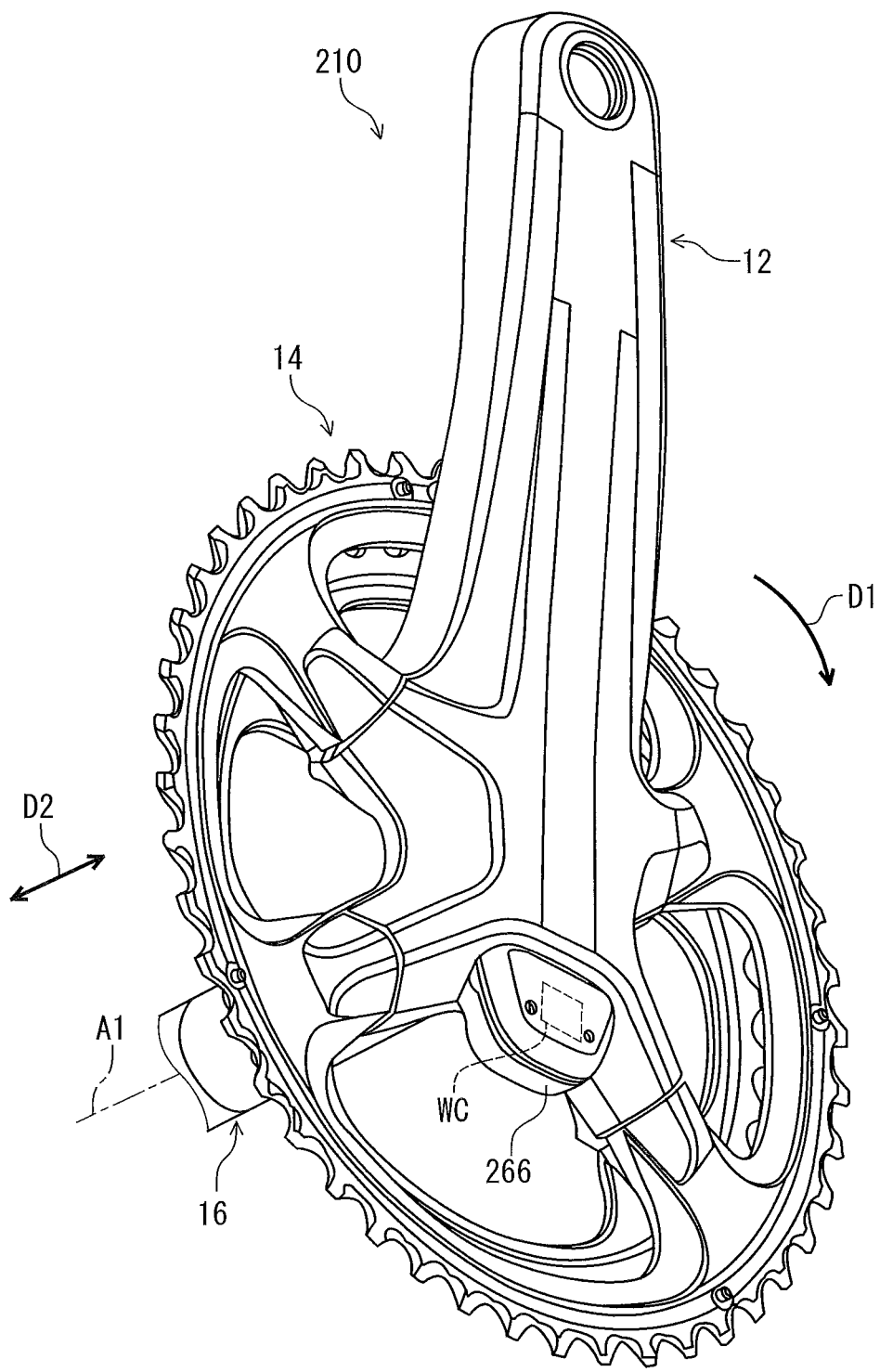
FIG. 21 is another perspective view of a crank assembly illustrated in FIG. 18.

As seen in FIG. 21, the crank assembly 210 includes an additional cover member 266. The additional cover member 266 is configured to be attached to the crank arm 12. For example, the wireless communicator WC is provided in the additional cover member 266. However, the wireless communicator WC can be provided positions other than the inside of the additional cover member 266 if needed and/or desired. The additional cover member 266 can be configured to be attached to other parts of the crank assembly 210 if needed and/or desired.

Figure 22:
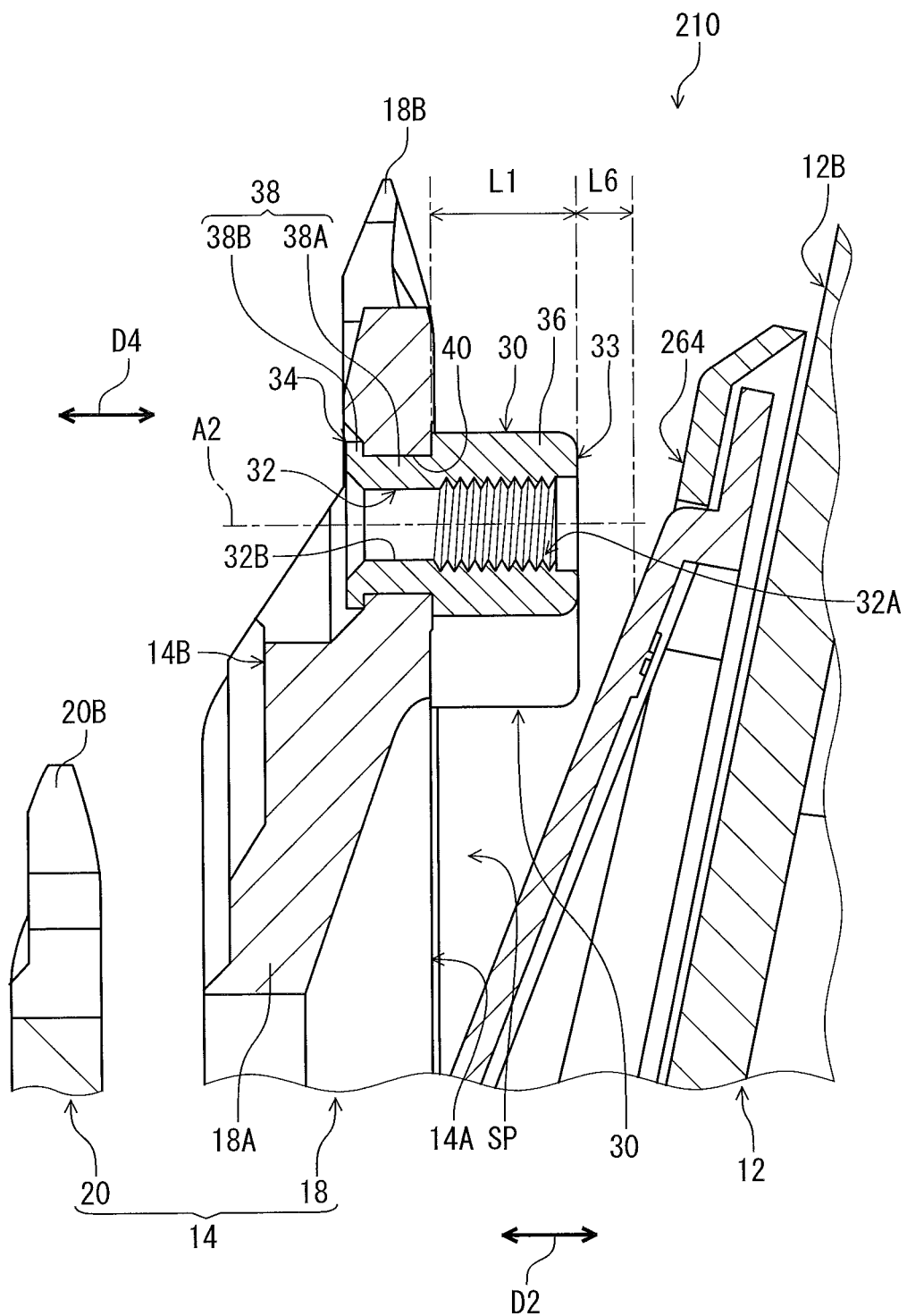
FIG. 22 is an enlarged partial cross-sectional view of the crank assembly illustrated in FIG. 20.

As seen in FIG. 22, the first axial length L1 of the chain-drop control section 36 is longer than a minimum distance L6 defined between the chain-drop control protrusion 30 and the cover member 264 in the bore axial direction D4. However, the first axial length L1 of the chain-drop control section 36 can be shorter than or equal to the minimum distance L6 if needed and/or desired.

In the present embodiment, the through bore 32 has the threaded portion 32A and the non-threaded portion 32B. However, one of the threaded portion 32A and the non-threaded portion 32B can be omitted from the through bore 32 if needed and/or desired.

Third Embodiment

A crank assembly 310 in accordance with a third embodiment will be described below referring to FIGS. 23 to 28.

The crank assembly 310 has the same structure and/or configuration as those of the crank assembly 210 except for the chain-drop control protrusion 30. Thus, elements having substantially the same function as those in the first and second embodiments will be numbered the same here and will not be described and/or illustrated again in detail here for the sake of brevity.

Figure 23:
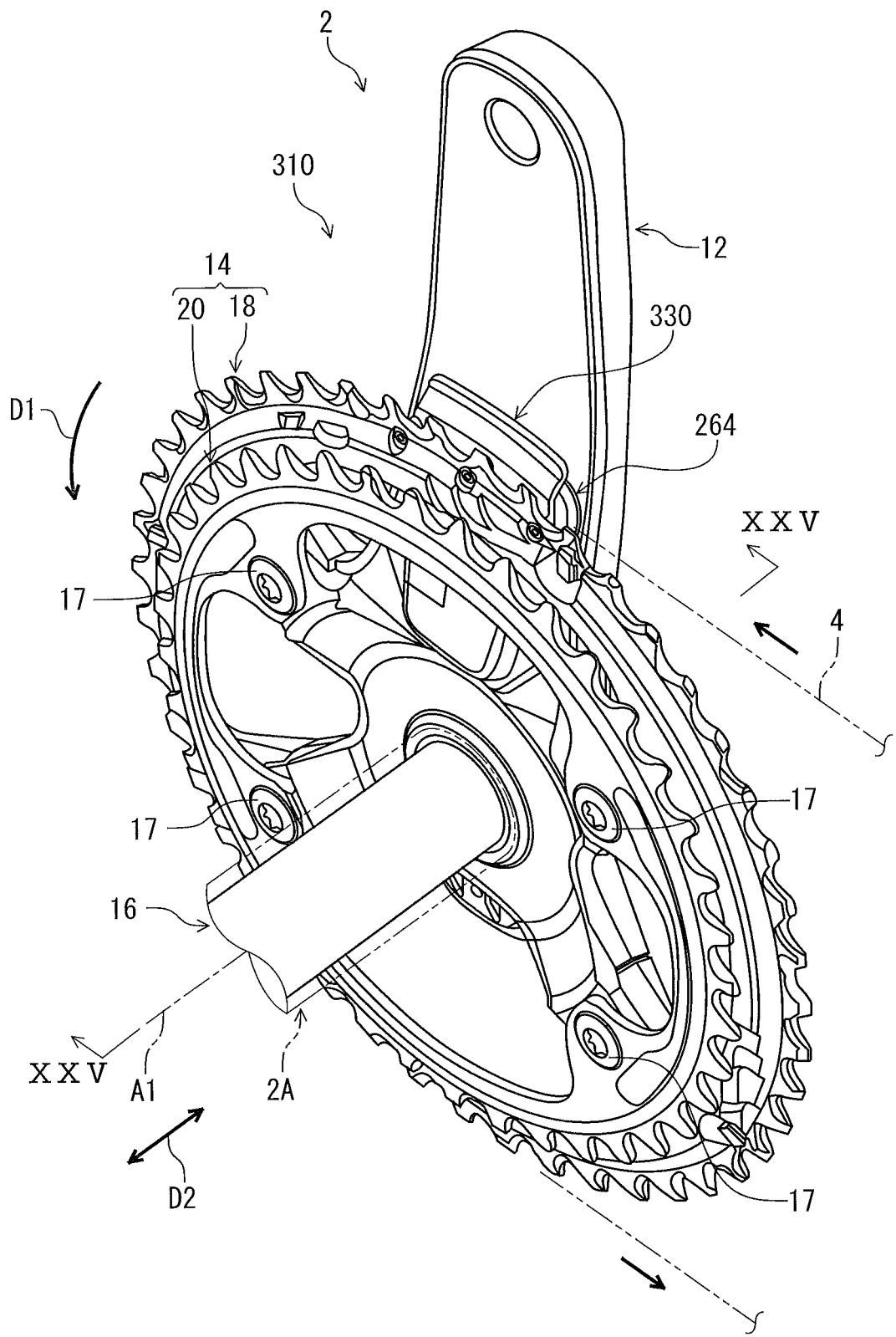
FIG. 23 is a perspective view of a crank assembly in accordance with a third embodiment.

As seen in FIG. 23, the crank assembly 310 for the human powered vehicle 2 comprises the crank arm 12 and the front sprocket unit 14. The crank assembly 310 comprises the crank axle 16.

Figure 24:
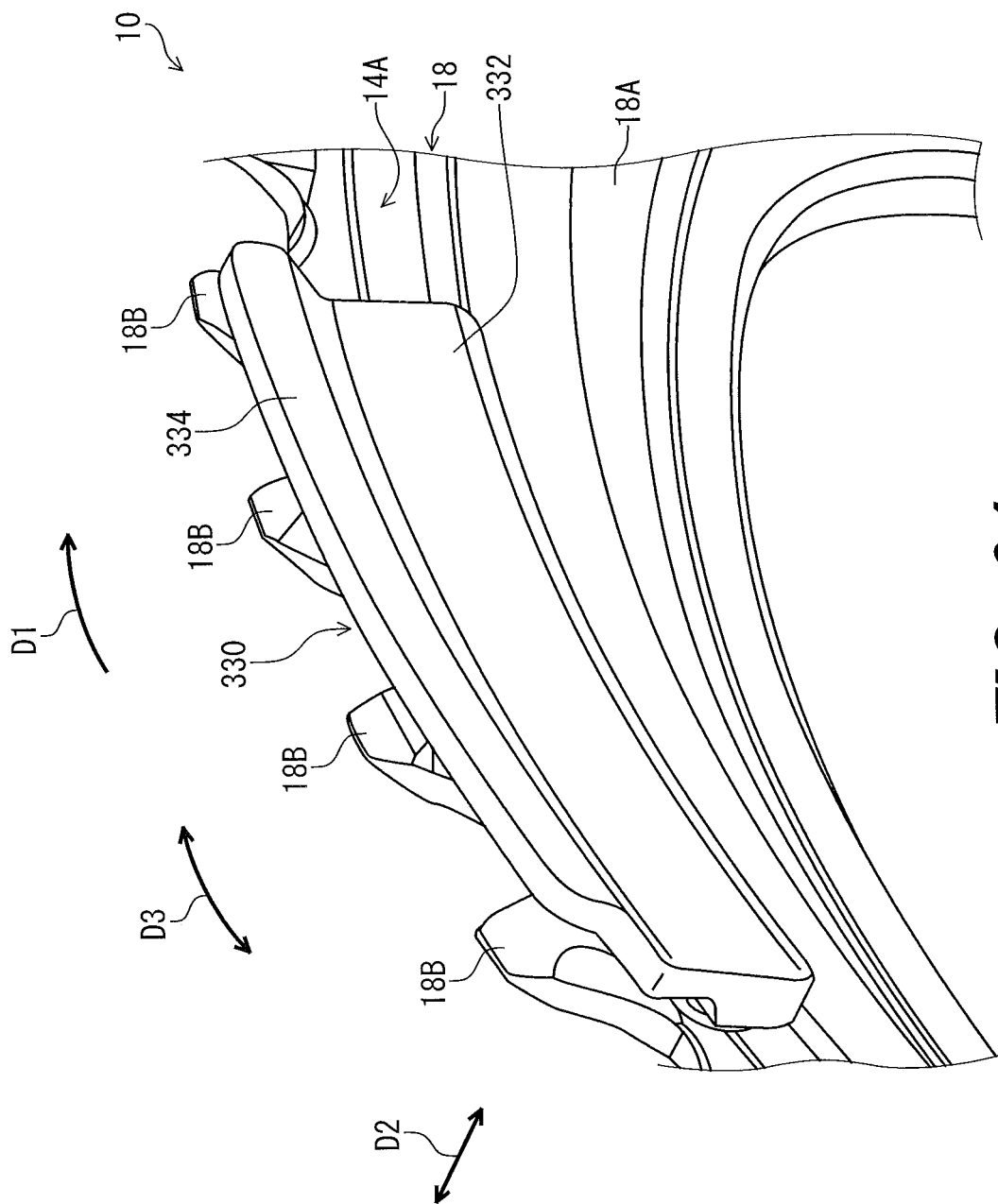
FIG. 24 is a partial perspective view of the crank assembly illustrated in FIG. 23.

As seen in FIG. 24, the crank assembly 310 for the human powered vehicle 2 comprises at least one chain-drop control member 330. In the present embodiment, the crank assembly 310 comprises a single chain-drop control member 330. However, the crank assembly 310 comprises a plurality of chain-drop control members 330 if needed and/or desired.

Figure 25:
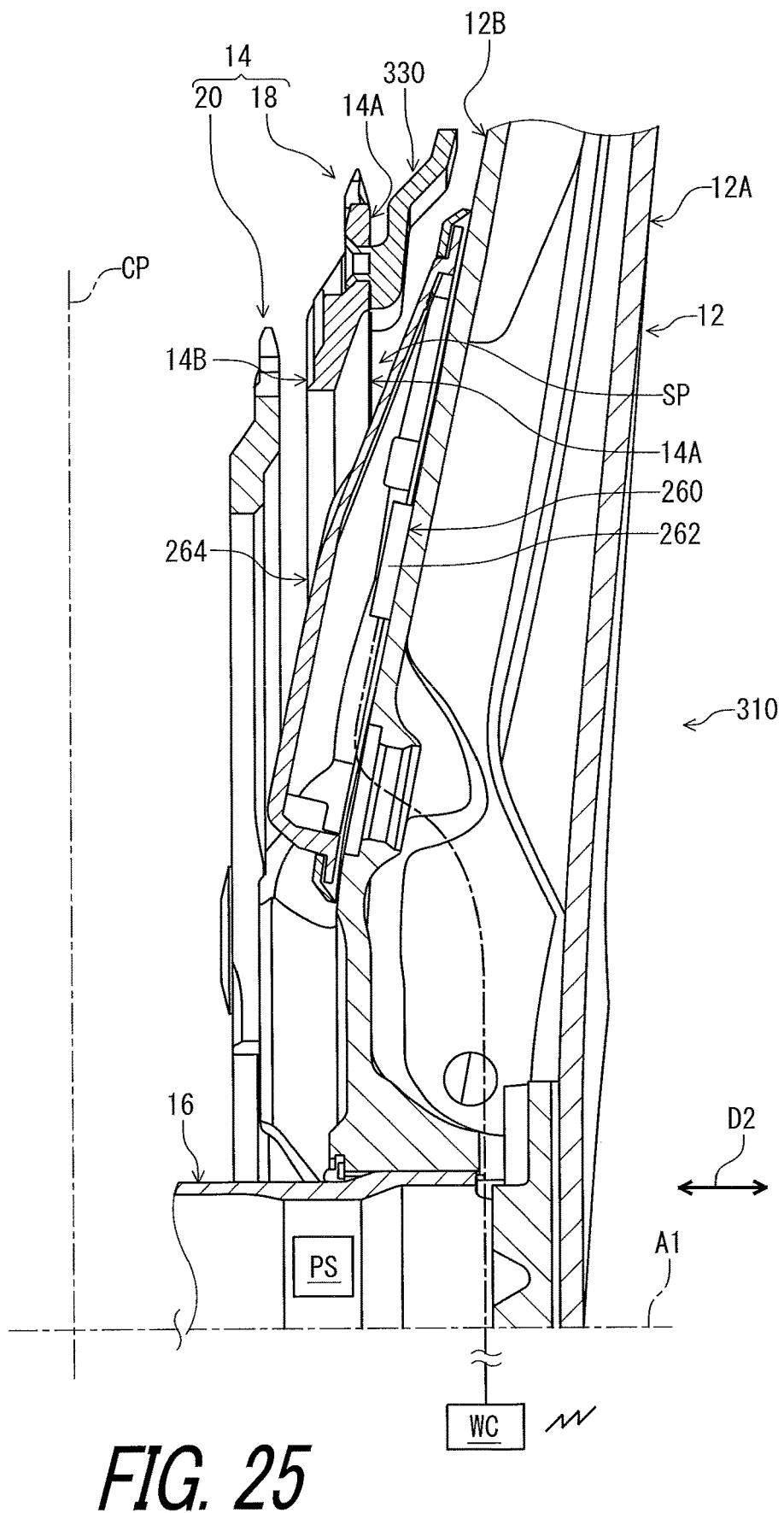
FIG. 25 is a partial cross-sectional view of the crank assembly taken along line XXV-XXV of FIG. 23.

As seen in FIG. 25, the at least one chain-drop control member 330 is configured to inhibit the drive chain 4 from getting into the space SP provided radially inwardly from the at least one chain-drop control member 330 and between the crank arm 12 and the front sprocket unit 14 in the axial direction D2.

The at least one chain-drop control member 330 is configured to be provided to at least one of the axially inwardly facing crank-surface 12B of the crank arm 12 and the axially outwardly facing sprocket-surface 14A of the front sprocket unit 14. The chain-drop control member 330 is configured to be provided to the axially outwardly facing sprocket-surface 14A among the axially inwardly facing crank-surface 12B and the axially outwardly facing sprocket-surface 14A. However, the at least one chain-drop control member 330 can be configured to be provided to only the axially inwardly facing crank-surface 12B or both of the axially inwardly facing crank-surface 12B and the axially outwardly facing sprocket-surface 14A if needed and/or desired.

Figure 26:
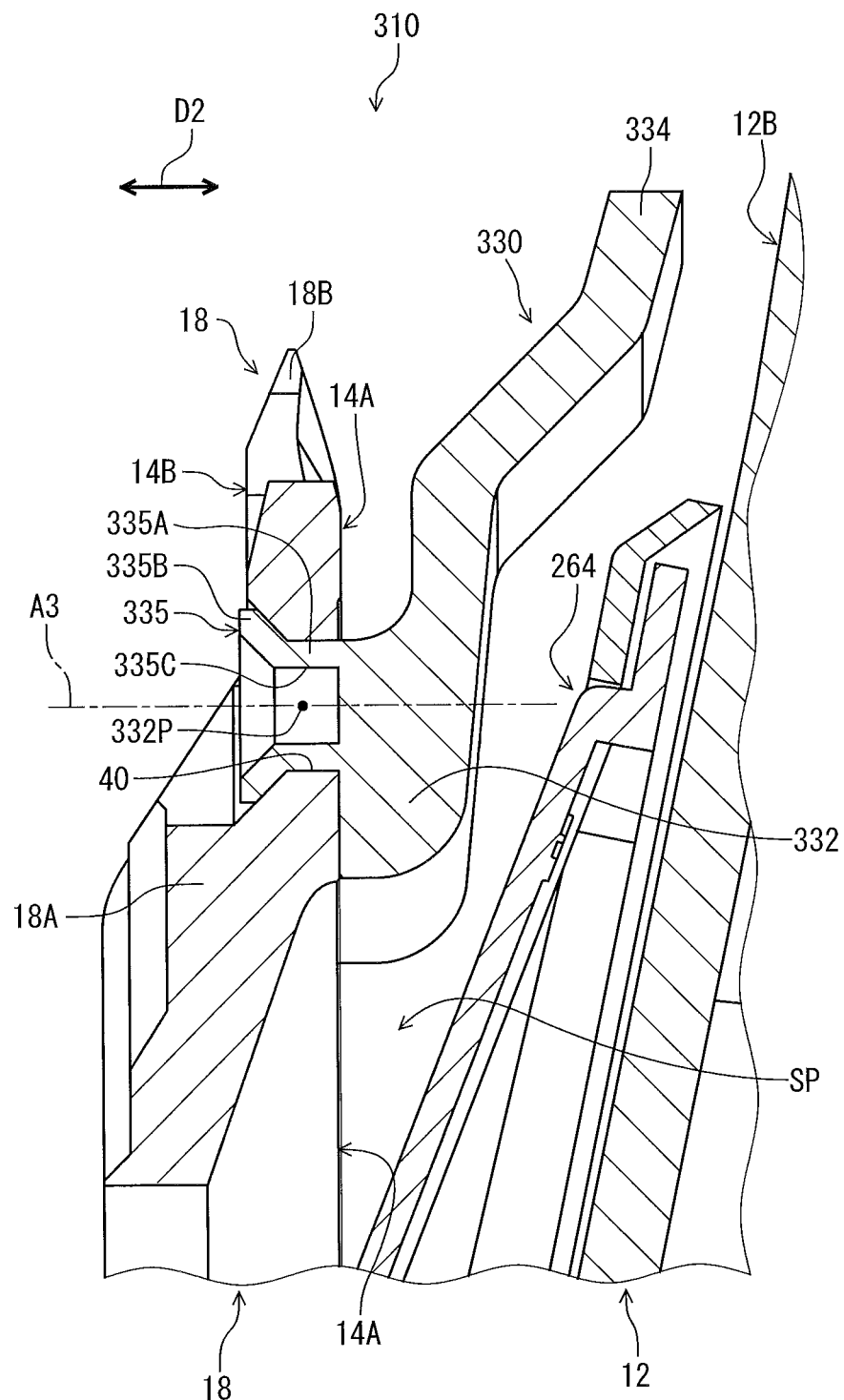
FIG. 26 is an enlarged partial cross-sectional view of the crank assembly illustrated in FIG. 25.

As seen in FIG. 26, the at least one chain-drop control member 330 has a proximal end 332 and a free distal end 334. The free distal end 334 is disposed radially outwardly from the proximal end 332 with respect to the rotational center axis A1. The free distal end 334 is disposed radially outwardly from the plurality of sprocket teeth 18B.

The proximal end 332 is attached to the at least one of the axially inwardly facing crank-surface 12B of the crank arm 12 and the axially outwardly facing sprocket-surface 14A of the front sprocket unit 14. In the present embodiment, the proximal end 332 is attached to the axially outwardly facing sprocket-surface 14A among the axially inwardly facing crank-surface 12B and the axially outwardly facing sprocket-surface 14A. However, the proximal end 332 can be attached to only the axially inwardly facing crank-surface 12B or both of the axially inwardly facing crank-surface 12B and the axially outwardly facing sprocket-surface 14A if needed and/or desired.

Figure 27:
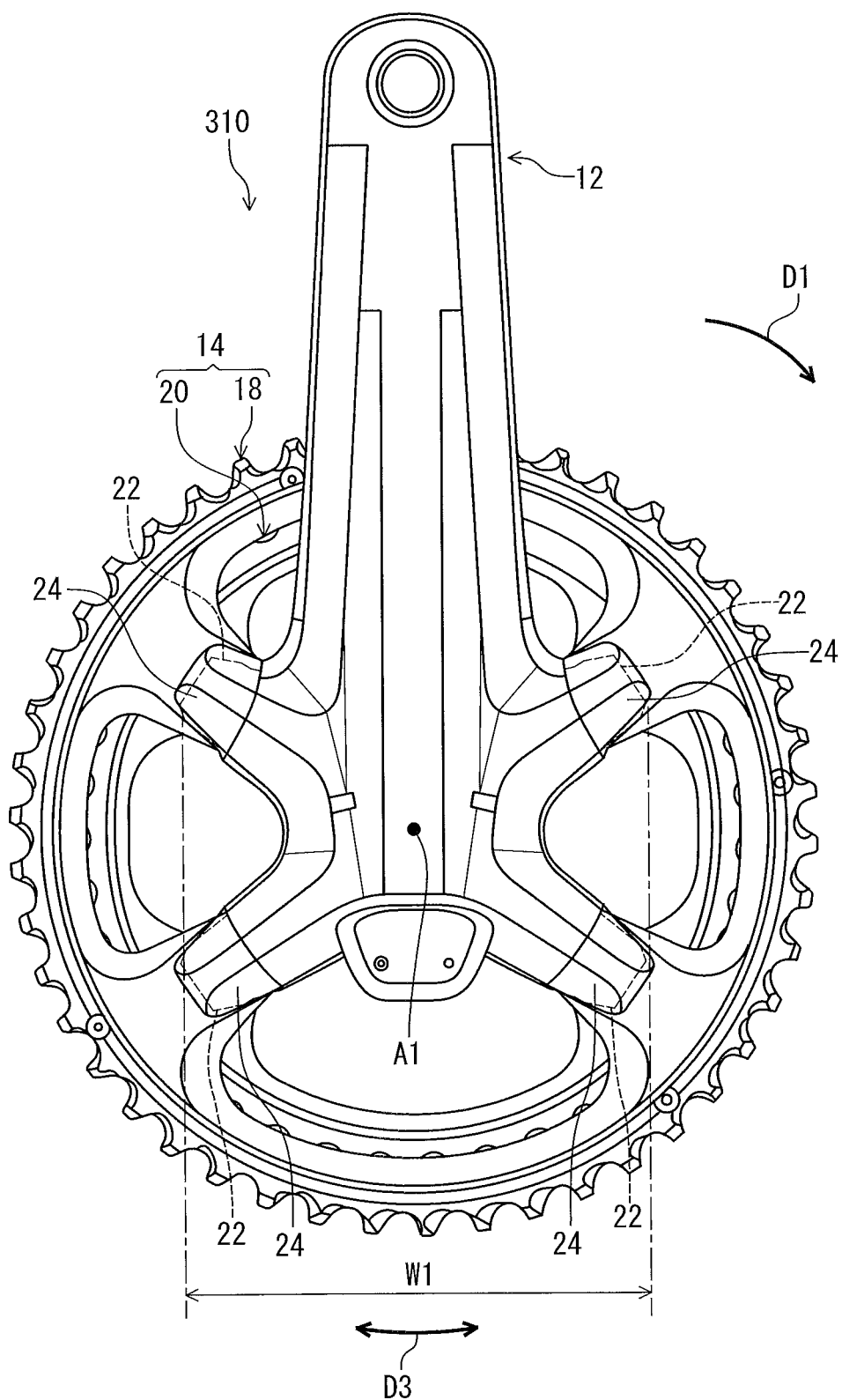
FIG. 27 is a side-elevational view of the crank assembly illustrated in FIG. 23.

As seen in FIG. 27, the crank arm 12 has a maximum circumferential crank-width W1 in the circumferential direction D3 with respect to the rotational center axis A1. The maximum circumferential crank-width W1 is defined in the circumferential direction D3. In the present embodiment, the plurality of coupling parts 22 defines the maximum circumferential crank-width W1. However, other parts of the crank arm 12 can define the maximum circumferential crank-width W1 if needed and/or desired.

Figure 28:
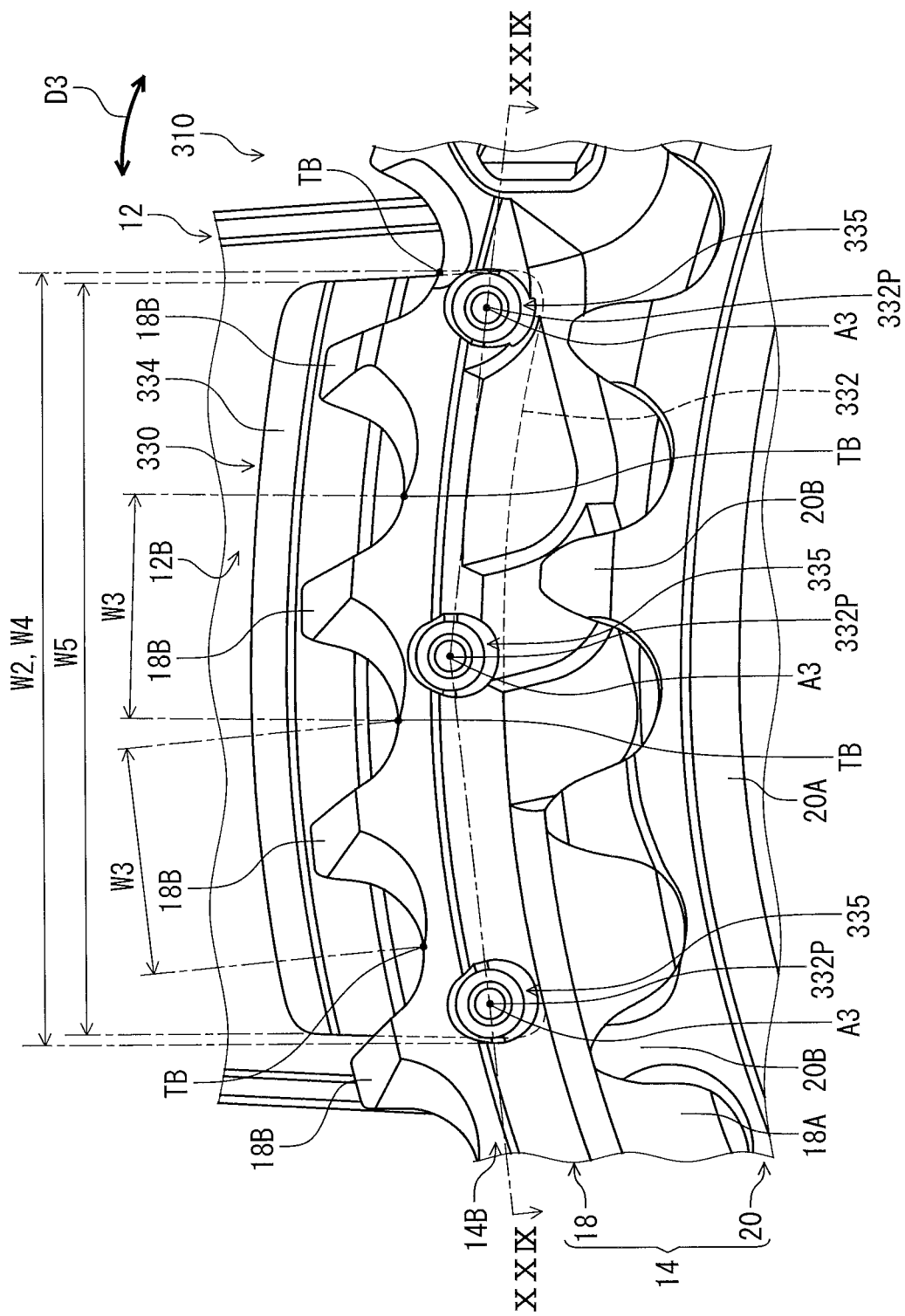
FIG. 28 is a partial side-elevational view of the crank assembly illustrated in FIG. 23.

As seen in FIG. 28, the at least one chain-drop control member 330 has a maximum circumferential member-width W2 in the circumferential direction D3. As seen in FIGS. 27 and 28, the maximum circumferential member-width W2 is equal to or smaller than the maximum circumferential crank-width W1. In the present embodiment, the maximum circumferential member-width W2 is smaller than the maximum circumferential crank-width W1. However, the maximum circumferential member-width W2 can be larger than or equal to the maximum circumferential crank-width W1 if needed and/or desired.

As seen in FIG. 28, the plurality of sprocket teeth 18B each has a circumferential tooth-width W3 defined between adjacent tooth-bottom center-points TB in the circumferential direction D3. The sprocket tooth 18B includes tooth-bottom center-points TB and is provided between the tooth-bottom center-points TB in the circumferential direction D3. The maximum circumferential member-width W2 is equal to or larger than the circumferential tooth-width W3. The maximum circumferential member-width W2 is equal to or larger than double of the circumferential tooth-width W3.

In the present embodiment, the maximum circumferential member-width W2 is larger than the circumferential tooth-width W3. The maximum circumferential member-width W2 is larger than double of the circumferential tooth-width W3. However, the maximum circumferential member-width W2 can be smaller than or equal to the circumferential tooth-width W3 if needed and/or desired. The maximum circumferential member-width W2 can be smaller than or equal to double of the circumferential tooth-width W3 if needed and/or desired.

The proximal end 332 of the at least one chain-drop control member 330 has a maximum circumferential proximal-width W4 in the circumferential direction D3. The maximum circumferential proximal-width W4 is defined in the circumferential direction D3. The maximum circumferential proximal-width W4 is equal to or larger than the circumferential tooth-width W3. In the present embodiment, the maximum circumferential proximal-width W4 is larger than the circumferential tooth-width W3. However, the maximum circumferential proximal-width W4 can be smaller than or equal to the circumferential tooth-width W3 if needed and/or desired.

The free distal end 334 of the at least one chain-drop control member 330 has a maximum circumferential distal-width W5 in the circumferential direction D3. The maximum circumferential distal-width W5 is defined in the circumferential direction D3. The maximum circumferential distal-width W5 is equal to or larger than the circumferential tooth-width W3. In the present embodiment, the maximum circumferential distal-width W5 is larger than the circumferential tooth-width W3. However, the maximum circumferential distal-width W5 can be smaller than or equal to the circumferential tooth-width W3 if needed and/or desired.

Figure 29:
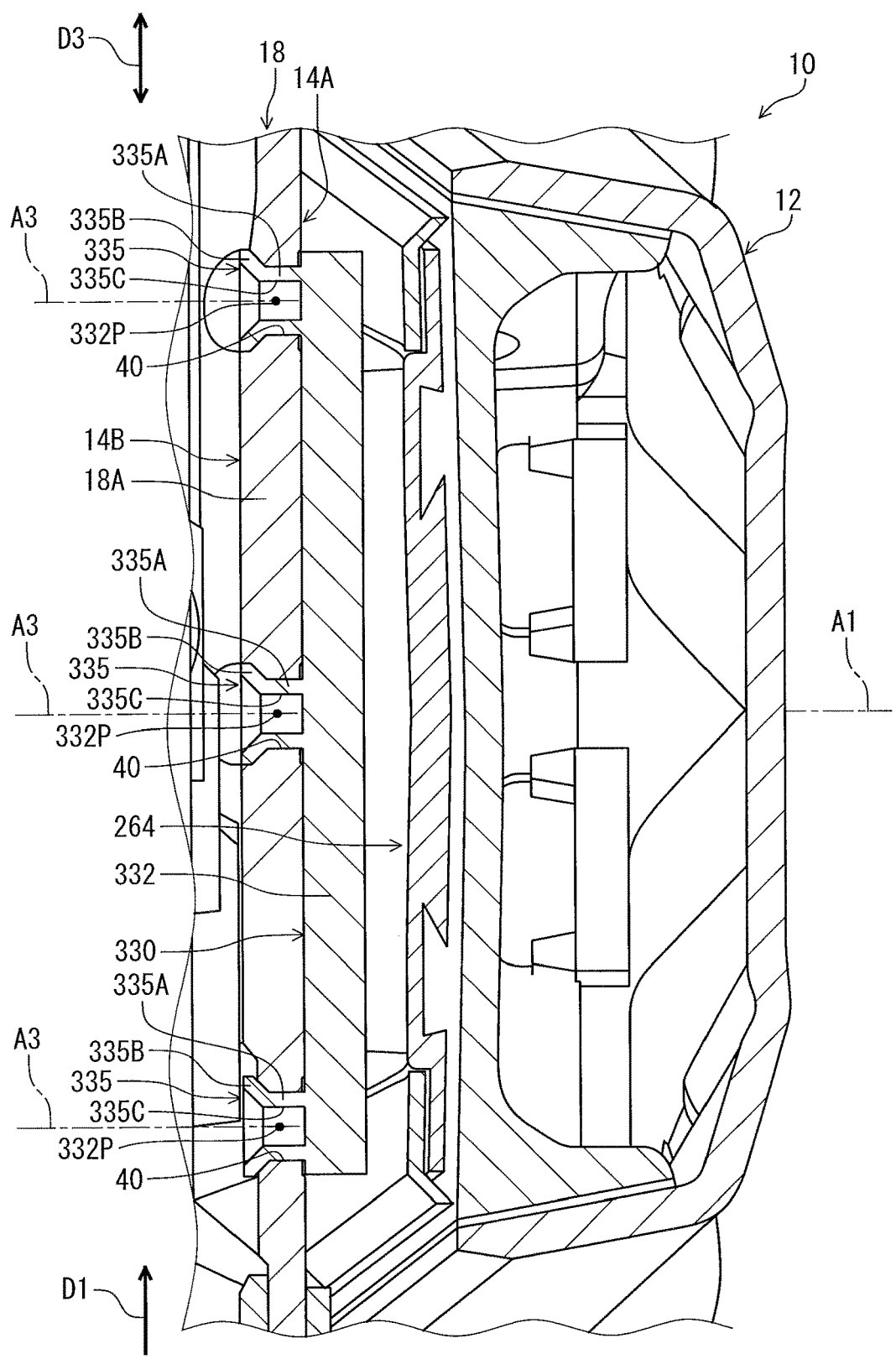
FIG. 29 is a partial cross-sectional view of the crank assembly taken along line XXIX-XXIX of FIG. 28.

As seen in FIG. 29, the proximal end 332 is attached to the at least one of the axially inwardly facing crank-surface 12B of the crank arm 12 and the axially outwardly facing sprocket-surface 14A of the front sprocket unit 14 at a plurality of points 332P. In the present embodiment, the proximal end 332 is attached to the axially outwardly facing sprocket-surface 14A among the axially inwardly facing crank-surface 12B and the axially outwardly facing sprocket-surface 14A at the plurality of points 332P. However, the proximal end 332 can be attached to only the axially inwardly facing crank-surface 12B or both of the axially inwardly facing crank-surface 12B and the axially outwardly facing sprocket-surface 14A at the plurality of points 332P if needed and/or desired.

The chain-drop control member 330 includes a plurality of attachment parts 335. The plurality of attachment parts 335 defines the plurality of points 332P. The plurality of attachment parts 335 is spaced apart from each other in the circumferential direction D3. The plurality of attachment parts 335 extends from the proximal end 332. The attachment part 335 is at least partially provided in the attachment hole 40 of the front sprocket unit 14. In the present embodiment, the attachment part 335 is partially provided in the attachment hole 40 of the front sprocket unit 14. However, the attachment part 335 can be entirely provided in the attachment hole 40 of the front sprocket unit 14 if needed and/or desired.

The attachment part 335 includes a first attachment part 335A, a second attachment part 335B, and a hole 335C. The first attachment part 335A is provided in the attachment hole 40. The second attachment part 335B is provided outside the attachment hole 40. The hole 335C has a center axis A3. The point 332P is defined on the center axis A3. The first attachment part 335A has an annular shape. The second attachment part 335B has an annular shape. The second attachment part 335B has an outer diameter larger than an outer diameter of the first attachment part 335A. For example, the second attachment part 335B is formed by being swaged. However, the second attachment part 335B can be formed by other methods. The second attachment part 335B can be omitted from the attachment part 335 e.g. if the attachment part 335 is coupled to the attachment hole 40 by an adhesive agent or in a press-fitting manner.

In the present embodiment, the free distal end 334 is integrally provided with the proximal end 332 as a one-piece unitary member. The attachment part 335 is integrally provided with the proximal end 332 as a one-piece unitary member. However, the free distal end 334 can be a separate member from the proximal end 332 if needed and/or desired. At least one of the attachment parts 335 can be a separate member from the proximal end 332 if needed and/or desired.

In the present embodiment, a total number of the points 332P is three. A total number of the attachment parts 335 is three. However, the total number of the points 332P can be greater than or equal to two if needed and/or desired. The total number of the attachment parts 335 can be greater than or equal to two if needed and/or desired.

MODIFICATIONS

Figure 30:
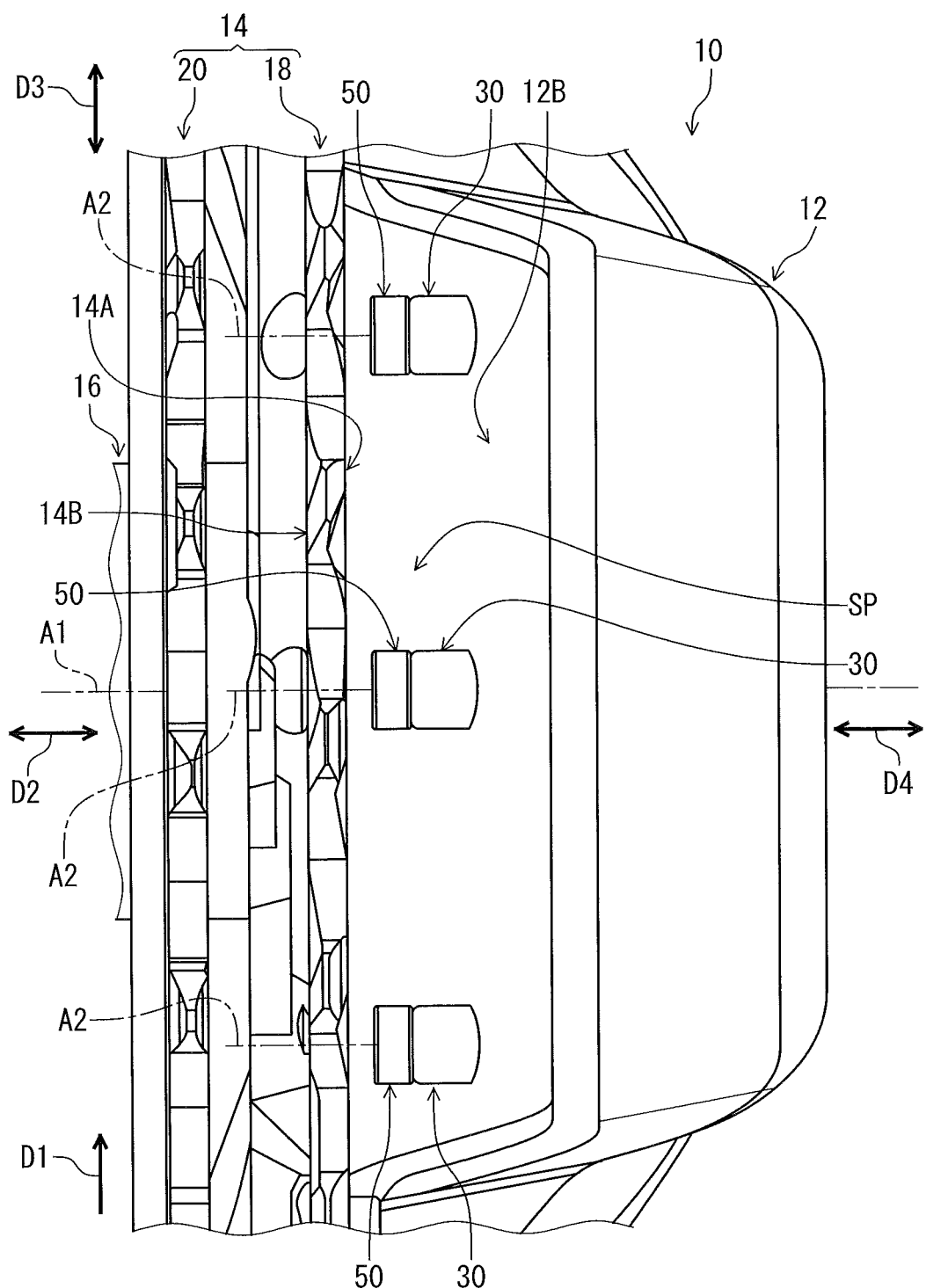
FIG. 30 is a partial top view of a crank assembly in accordance with a modification.
Figure 31:
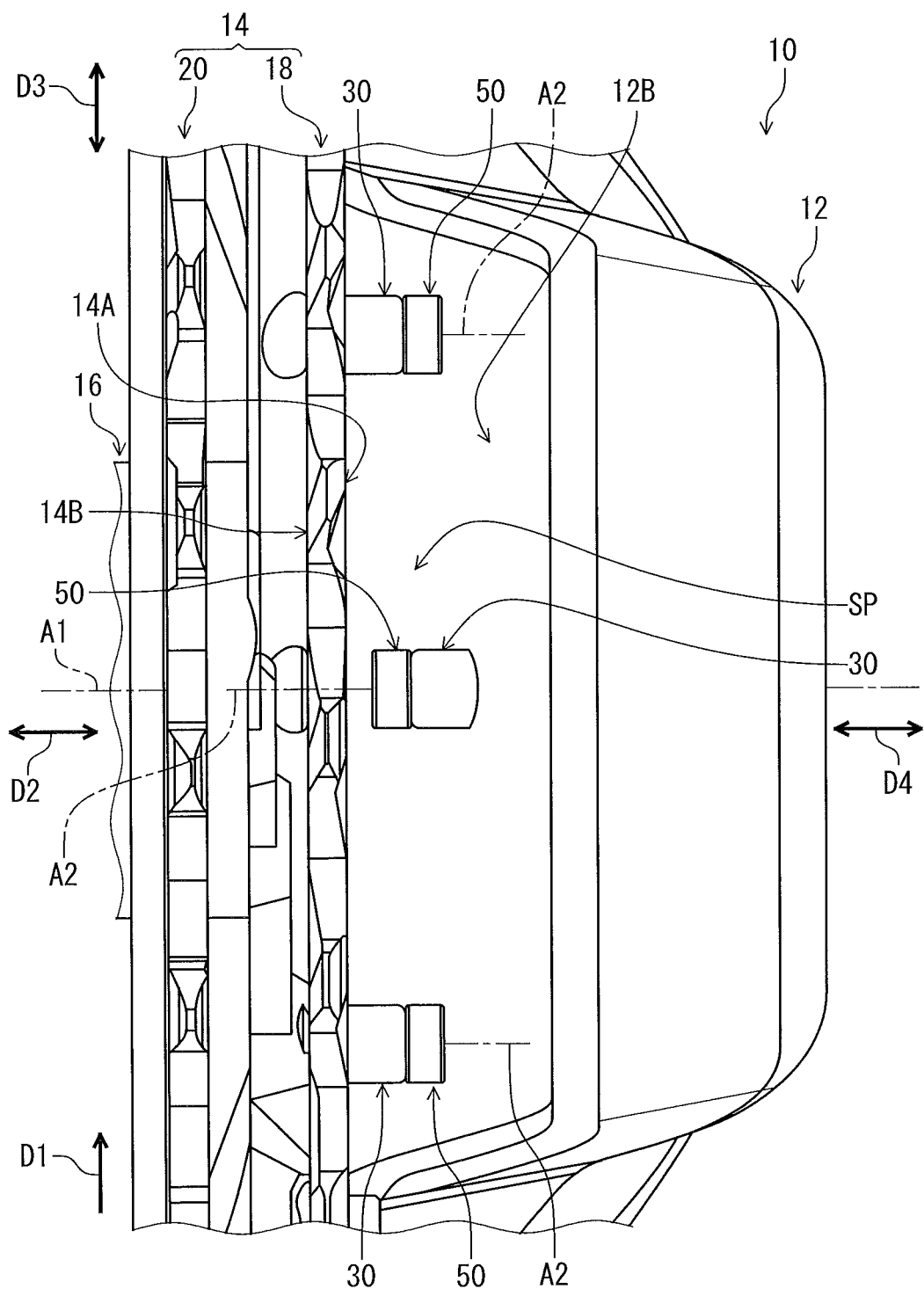
FIG. 31 is a partial top view of a crank assembly in accordance with another modification.

In the first embodiment, as seen in FIG. 7, the at least one chain-drop control protrusion 30 is configured to be provided to the front sprocket unit 14 among the crank arm 12 and the front sprocket unit 14. The at least one chain-drop control protrusion 30 is configured to be provided to the axially outwardly facing sprocket-surface 14A among the axially inwardly facing crank-surface 12B and the axially outwardly facing sprocket-surface 14A. As seen in FIGS. 30 and 31, however, the at least one chain-drop control protrusion 30 can be configured to be provided to only the crank arm 12 or both of the crank arm 12 and the front sprocket unit 14 if needed and/or desired. The at least one chain-drop control protrusion 30 can be configured to be provided to the axially inwardly facing crank-surface 12B of the crank arm 12 or both of the axially inwardly facing crank-surface 12B of the crank arm 12 and the axially outwardly facing sprocket-surface 14A of the front sprocket unit 14 if needed and/or desired. The same can be applied to the crank assembly 210 in accordance with the second embodiment.

In the first and second embodiments and the modifications thereof, each chain-drop control protrusion of the plurality of chain-drop control protrusions 30 has the same structure as each other. However, at least one chain-drop control protrusion of the plurality of chain-drop control protrusions 30 can have a structure different from a structure of another chain-drop control protrusion of the plurality of chain-drop control protrusions 30 if needed and/or desired.

In the first embodiment and the modifications thereof, each additional chain-drop control protrusion of the plurality of additional chain-drop control protrusions 50 has the same structure as each other. However, at least one additional chain-drop control protrusion of the plurality of additional chain-drop control protrusions 50 can have a structure different from a structure of another additional chain-drop control protrusion of the plurality of additional chain-drop control protrusions 50 if needed and/or desired.

Figure 32:
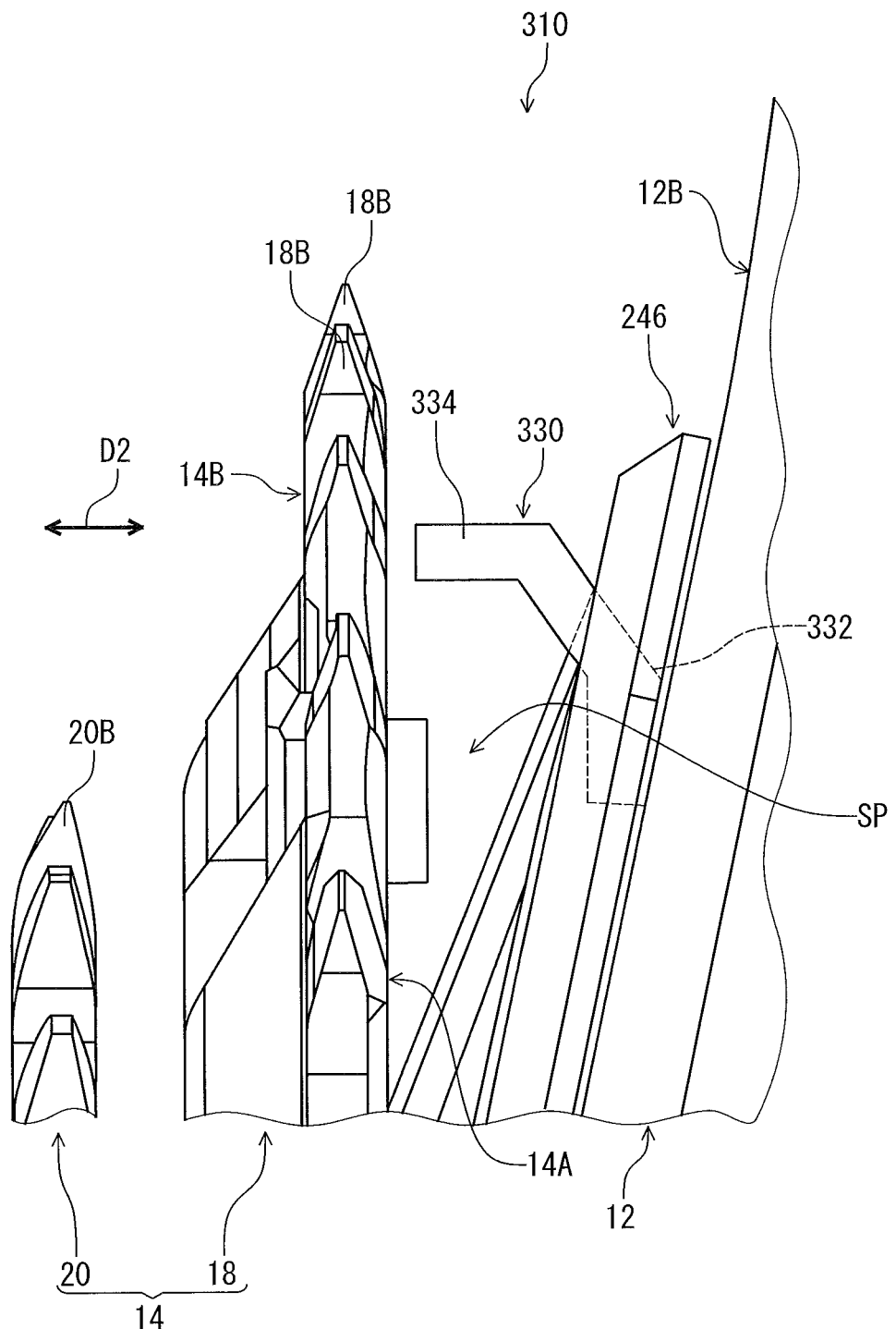
FIG. 32 is a partial rear view of a crank assembly in accordance with another modification.
Figure 33:
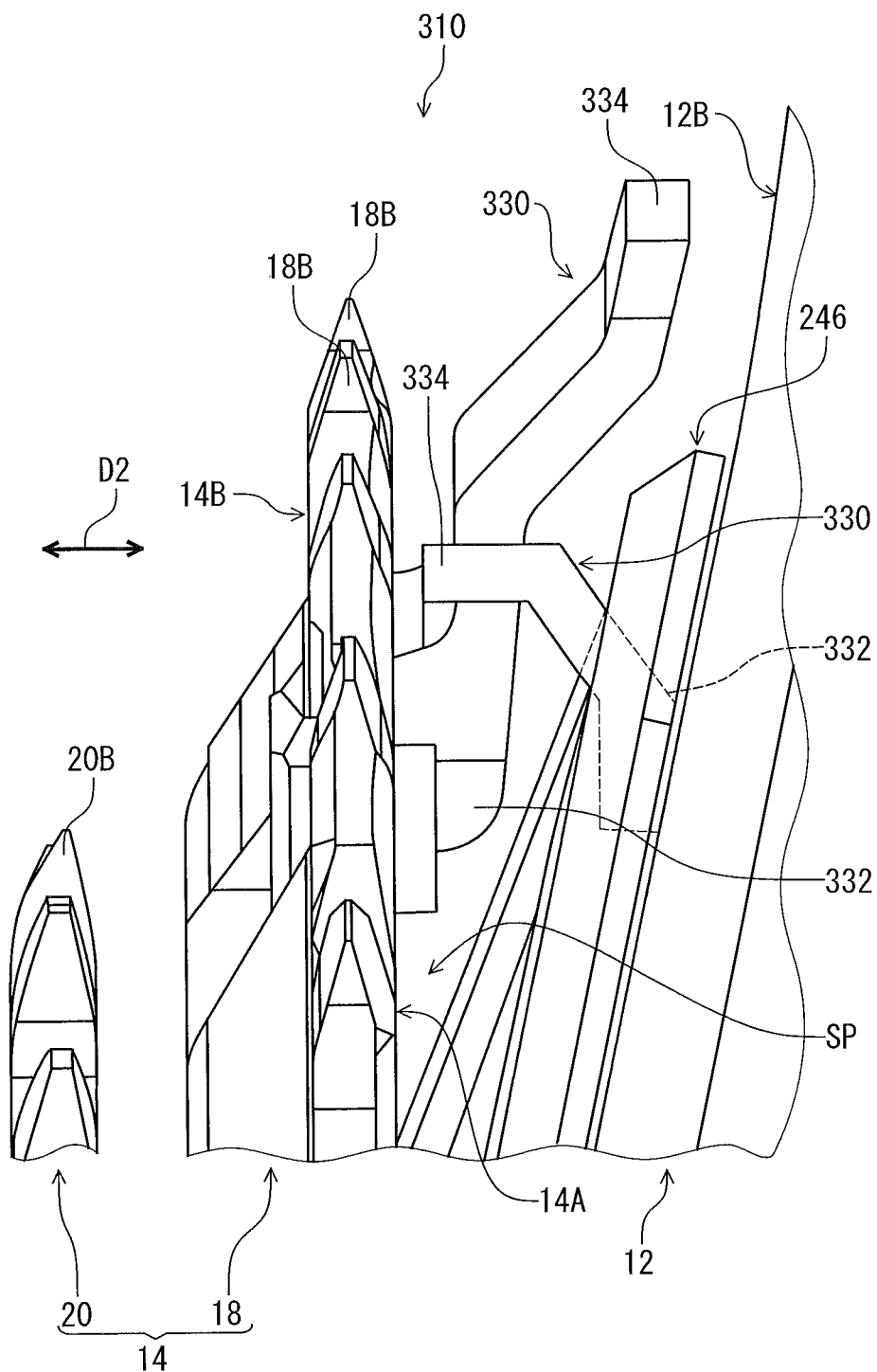
FIG. 33 is a partial rear view of a crank assembly in accordance with another modification.

In the third embodiment, as seen in FIG. 26, the at least one chain-drop control member 330 is configured to be provided to the front sprocket unit 14 among the crank arm 12 and the front sprocket unit 14. The at least one chain-drop control member 330 is configured to be provided to the axially outwardly facing sprocket-surface 14A among the axially inwardly facing crank-surface 12B and the axially outwardly facing sprocket-surface 14A. As seen in FIGS. 32 and 33, however, the at least one chain-drop control member 330 can be configured to be provided to only the crank arm 12 or both of the crank arm 12 and the front sprocket unit 14 if needed and/or desired. The at least one chain-drop control member 330 can be configured to be provided to the axially inwardly facing crank-surface 12B of the crank arm 12 or both of the axially inwardly facing crank-surface 12B of the crank arm 12 and the axially outwardly facing sprocket-surface 14A of the front sprocket unit 14 if needed and/or desired.

In the modification illustrated in FIG. 33, each chain-drop control member of the plurality of chain-drop control members 330 has different structures from each other. However, at least one chain-drop control member of the plurality of chain-drop control members 330 can have the same structure as a structure of another chain-drop control member of the plurality of chain-drop control members 330 if needed and/or desired.

The first to third embodiments and the modifications thereof can be combined with each other if needed and/or desired. For example, the crank assembly 10 can comprise at least one chain-drop control projection 30 and at least one chain-drop control member 50.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A crank assembly for a human-powered vehicle, the crank assembly comprising:
   a crank arm having an axially outwardly facing crank-surface and an axially inwardly facing crank-surface provided on a reverse side of the axially outwardly facing crank-surface in an axial direction with respect to a rotational center axis of the crank assembly, the axially inwardly facing crank-surface being configured to face toward an axial center plane of the human powered vehicle in the axial direction in a mounted state where the crank assembly is mounted to the human powered vehicle;
   a front sprocket unit having an axially outwardly facing sprocket-surface and an axially inwardly facing sprocket-surface provided on a reverse side of the axially outwardly facing sprocket-surface in the axial direction, the axially inwardly facing sprocket-surface being configured to face toward the axial center plane of the human powered vehicle in the axial direction in the mounted state, the front sprocket unit including:
   a sprocket body; and
   a plurality of sprocket teeth extending radially outwardly from the sprocket body in a radial direction with respect to the rotational center axis; and
   at least one chain-drop control protrusion configured to inhibit a drive chain from getting into a space provided radially inwardly from the at least one control protrusion and between the crank arm and the front sprocket unit in the axial direction, the at least one chain-drop control protrusion being configured to be provided to at least one of the axially inwardly facing crank-surface of the crank arm and the axially outwardly facing sprocket-surface of the front sprocket unit, the at least one chain-drop control protrusion having a through bore, an entirety of the at least one chain-drop control protrusion is disposed radially inwardly from an outermost tip of the plurality of sprocket teeth.

2. A crank assembly for a human-powered vehicle, the crank assembly comprising:
- a crank arm having an axially outwardly facing crank-surface and an axially inwardly facing crank-surface provided on a reverse side of the axially outwardly facing crank-surface in an axial direction with respect to a rotational center axis of the crank assembly, the axially inwardly facing crank-surface being configured to face toward an axial center plane of the human powered vehicle in the axial direction in a mounted state where the crank assembly is mounted to the human powered vehicle;
- a front sprocket unit having an axially outwardly facing sprocket-surface and an axially inwardly facing sprocket-surface provided on a reverse side of the axially outwardly facing sprocket-surface in the axial direction, the axially inwardly facing sprocket-surface being configured to face toward the axial center plane of the human powered vehicle in the axial direction in the mounted state, the front sprocket unit including:
  - a sprocket body; and
  - a plurality of sprocket teeth extending radially outwardly from the sprocket body in a radial direction with respect to the rotational center axis; and
- at least one chain-drop control protrusion configured to inhibit a drive chain from getting into a space provided radially inwardly from the at least one control protrusion and between the crank arm and the front sprocket unit in the axial direction, the at least one chain-drop control protrusion being configured to be provided to at least one of the axially inwardly facing crank-surface of the crank arm and the axially outwardly facing sprocket-surface of the front sprocket unit, the at least one chain-drop control protrusion having a through bore, wherein
- the at least one chain-drop control protrusion has a free end and an attachment end configured to be coupled to the at least one of the axially inwardly facing crank-surface of the crank arm and the axially outwardly facing sprocket-surface of the front sprocket unit; and
- the through bore has a bore center-axis extending from one of the free end and the attachment end to the other of the free end and the attachment end.

3. The crank assembly according to claim 2, wherein
the at least one chain-drop control protrusion has a chain-drop control section and an attachment section adjacent to the chain-drop control section in a bore axial direction with respect to the bore center-axis,
the chain-drop control section includes the free end, and
the attachment section includes the attachment end.

4. The crank assembly according to claim 3, wherein
the chain-drop control section has a first maximum diameter with respect to the bore center-axis,
the attachment section has a second maximum diameter with respect to the bore center-axis, and
the first maximum diameter is larger than the second maximum diameter.

5. The crank assembly according to claim 3, wherein
the chain-drop control section has a first axial length with respect to the bore center-axis,
the attachment section has a second axial length with respect to the bore center-axis, and
the first axial length is larger than the second axial length.

6. The crank assembly according to claim 3, wherein
the chain-drop control section has a radially outermost surface with respect to the bore center-axis and a chamfered portion,
the free end has an axial free-end surface with respect to the bore center-axis, and
the chamfered portion is provided between the radially outermost surface and the axial free-end surface.

7. The crank assembly according to claim 6, wherein
the chamfered portion has a curvature.

8. The crank assembly according to claim 3, wherein
the through bore has a threaded portion provided at least in the chain-drop control section of the at least one chain-drop control protrusion.

9. The crank assembly according to claim 8, further comprising:
an additional chain-drop control protrusion configured to threadedly engage with the threaded portion of the through bore.

10. The crank assembly according to claim 3, wherein
the through bore has a large diameter bore and a small diameter bore connected to the large diameter bore,
the large diameter bore extends from the free end in a bore axial direction with respect to the bore center-axis, and
the small diameter bore extends from the attachment end in the bore axial direction.

11. The crank assembly according to claim 10, wherein
the large diameter bore and the small diameter bore are connected to each other at a connecting point, and
the threaded portion extends from the connecting point along the bore axial direction in the small diameter bore.

12. The crank assembly according to claim 11, wherein
the connecting point is located in the chain-drop control section.

13. The crank assembly according to claim 3, wherein
the attachment section has a non-circular cross-sectional shape.

14. The crank assembly according to claim 8, wherein
the at least one chain-drop control protrusion has a chain-drop control section and an attachment section adjacent to the chain-drop control section in a bore axial direction with respect to the bore center-axis,
the through bore has a non-threaded portion provided in the attachment section and adjacent to the threaded portion, and
the non-threaded portion has a non-threaded internal diameter that is equal to an internal minor diameter of the threaded portion.

15. The crank assembly according to claim 1, further comprising:
an electrical component provided to the crank arm at a location radially inwardly from the at least one chain-drop control protrusion.

16. The crank assembly according to claim 15, wherein
the electrical component includes a force sensor.

17. The crank assembly according to claim 15, further comprising:
a cover member configured to be attached to the axially inwardly facing crank-surface of the crank arm so as to cover the electrical component in an assembled state of the crank assembly.

18. The crank assembly according to claim 17, wherein
the cover member is made of a non-metallic material.

19. A crank assembly for a human-powered vehicle, the crank assembly comprising:
- a crank arm having an axially outwardly facing crank-surface and an axially inwardly facing crank-surface provided on a reverse side of the axially outwardly facing crank-surface in an axial direction with respect to a rotational center axis of the crank assembly, the axially inwardly facing crank-surface being configured to face toward an axial center plane of the human powered vehicle in the axial direction in a mounted state where the crank assembly is mounted to the human powered vehicle;

a front sprocket unit having an axially outwardly facing sprocket-surface and an axially inwardly facing sprocket-surface provided on a reverse side of the axially outwardly facing sprocket-surface in the axial direction, the axially inwardly facing sprocket-surface being configured to face toward the axial center plane of the human powered vehicle in the axial direction in the mounted state, the front sprocket unit including:

a sprocket body; and a plurality of sprocket teeth extending radially outwardly from the sprocket body in a radial direction with respect to the rotational center axis; and at least one chain-drop control protrusion configured to inhibit a drive chain from getting into a space provided radially inwardly from the at least one control protrusion and between the crank arm and the front sprocket unit in the axial direction, the at least one chain-drop control protrusion being configured to be provided to at least one of the axially inwardly facing crank-surface of the crank arm and the axially outwardly facing sprocket-surface of the front sprocket unit, the at least one chain-drop control protrusion having a through bore, wherein the at least one chain-drop control protrusion includes a plurality of chain-drop control protrusions spaced apart from each other in a circumferential direction with respect to the rotational center axis.

20. The crank assembly according to claim 1, wherein the at least one chain-drop control protrusion is disposed radially inwardly from the plurality of sprocket teeth.

21. A crank assembly for a human-powered vehicle, the crank assembly comprising:

a crank arm having an axially outwardly facing crank-surface and an axially inwardly facing crank-surface provided on a reverse side of the axially outwardly facing crank-surface in an axial direction with respect to a rotational center axis of the crank assembly, the axially inwardly facing crank-surface being configured to face toward an axial center plane of the human powered vehicle in the axial direction in a mounted state where the crank assembly is mounted to the human powered vehicle;

a front sprocket unit having an axially outwardly facing sprocket-surface and an axially inwardly facing sprocket-surface provided on a reverse side of the axially outwardly facing sprocket-surface in the axial direction, the axially inwardly facing sprocket-surface being configured to face toward the axial center plane of the human powered vehicle in the axial direction in the mounted state, the front sprocket unit including:

a sprocket body; and a plurality of sprocket teeth extending radially outwardly from the sprocket body in a radial direction with respect to the rotational center axis;

at least one chain-drop control protrusion configured to inhibit a drive chain from getting into a space provided radially inwardly from the at least one control protrusion and between the crank arm and the front sprocket unit in the axial direction, the at least one chain-drop control protrusion being configured to be provided to at least one of the axially inwardly facing crank-surface of the crank arm and the axially outwardly facing sprocket-surface of the front sprocket unit; and an electrical component provided to the axially inwardly facing crank-surface of the crank arm at a location radially inwardly from the at least one chain-drop control protrusion and between the crank arm and the front sprocket in the axial direction.

22. The crank assembly according to claim 21, wherein the at least one chain-drop control protrusion has a through bore.

\* \* \* \* \*